(12) United States Patent
Yoshida et al.

(10) Patent No.: US 8,803,374 B2
(45) Date of Patent: Aug. 12, 2014

(54) MOLDED MOTOR

(75) Inventors: Hiroshi Yoshida, Kyoto (JP); Akitoshi Maeno, Kyoto (JP); Junichi Sato, Kyoto (JP); Tatsuya Yoshida, Kyoto (JP)

(73) Assignee: Nidec Techno Motor Holdings Corporation, Kyoto (JP)

( * ) Notice: Subject to any disclaimer, the term of this patent is extended or adjusted under 35 U.S.C. 154(b) by 441 days.

(21) Appl. No.: 13/334,613

(22) Filed: Dec. 22, 2011

(65) Prior Publication Data

US 2012/0326538 A1 Dec. 27, 2012

(30) Foreign Application Priority Data

Dec. 29, 2010 (JP) ................................. 2010-294468
Aug. 10, 2011 (JP) ................................. 2011-174792

(51) Int. Cl.
*H02K 1/04* (2006.01)
(52) U.S. Cl.
USPC .............................................. 310/43; 310/90
(58) Field of Classification Search
USPC .............................................. 310/43, 89, 90
See application file for complete search history.

(56) References Cited

U.S. PATENT DOCUMENTS

| 4,471,246 | A  | * | 9/1984 | Paillet ............................ 310/90 |
| 6,673,463 | B1 | * | 1/2004 | Onishi et al. .................. 428/480 |
| 7,888,833 | B2 | * | 2/2011 | Okada ............................ 310/89 |
| 2005/0093379 | A1 | * | 5/2005 | Tanabe et al. .................. 310/43 |
| 2006/0220474 | A1 | * | 10/2006 | Yoshida ........................... 310/43 |
| 2007/0222305 | A1 | * | 9/2007 | Takada ............................ 310/43 |

FOREIGN PATENT DOCUMENTS

JP 2002-335649 A 11/2002

* cited by examiner

*Primary Examiner* — Dang Le

(57) ABSTRACT

A molded motor includes a stator, a resin casing, a rotor, a pair of bearings, a pair of bearing retainers, a resin bracket cover, and a control board. The rotor includes a shaft. The bearings are arranged to rotatably support the shaft. The bearing retainers are made of an elastic electrically insulating body. The bearing retainers are arranged to cover the bearings at radial outer sides of the bearings and to hold the bearings in place. The bracket cover is arranged to cover the open side of the casing. One of the bearings is attached to the bracket cover through one of the bearing retainers. The other bearing is attached to a bottom wall portion of the casing through the other bearing retainer.

20 Claims, 28 Drawing Sheets

MOLDED MOTOR

BACKGROUND OF THE INVENTION

1. Field of the Invention

The present invention relates to a molded motor.

2. Description of the Related Art

A molded motor including a resin casing opened at one axial end and a stator covered with a resin and embedded in the casing is known (see, e.g., Japanese Patent Application Publication No. 2002-335649). The stator of the molded motor includes a metal stator core. Stator coils are wound on respective tooth portions of the stator core. A rotor including a shaft is arranged radially inward of the stator. The shaft is rotatably supported by a pair of bearings.

A cylindrical bearing housing is molded as a single piece with the casing in the bottom wall portion of the casing. One of the bearings is fitted into the bearing housing. The open side of the casing is covered with a metal bracket cover. The bracket cover includes a cylindrical bearing housing. The other bearing is fitted to the cylindrical bearing housing of the bracket cover.

As disclosed in Japanese Patent Application Publication No. 2002-335649, the bracket cover is made of a metallic material which has an increased rigidity and superior workability. Thus, the bearing is assembled with the bracket cover such that it possesses increased accuracy. This helps reduce the shaft from being off-centered and assists in enhancing the rotational accuracy of the rotor.

In this case, the metal bracket cover and the metal stator core are arranged with a resin interposed there between as a dielectric body. For that reason, if a motor is PWM-controlled, an electric potential difference is generated between the bracket cover and the stator core and an electric current circulates along a route defined by the stator core, the stator coils, the bearing, the shaft, the rotor and the stator core. As s consequence, it is sometimes the case that the bearings are damaged due to electric corrosion.

SUMMARY OF THE INVENTION

A molded motor according to a preferred embodiment of the present invention preferably include a stator, a resin casing, a rotor, a pair of bearings, a pair of bearing retainers, a resin bracket cover, and a control board. The stator preferably includes a ring-shaped stator core provided with tooth portions and stator coils wound on the tooth portions of the stator core. The casing has a closed-bottom tubular shape opened at one axial side. The stator is preferably fixed to the casing by covering the stator with a resin and embedding the stator in the casing (i.e., through molding the stator in the casing). The rotor preferably includes a shaft. The rotor is arranged radially inward of the stator. The bearings are arranged to rotatably support the shaft. The bearing retainers are preferably made of an elastic electrically insulating body. The bearing retainers are arranged to cover the bearings at radial outer sides of the bearings and to hold the bearings in place. The bracket cover is arranged to cover the open side of the casing. The control board includes a circuit arranged to control a drive current supplied to the stator coils. One of the bearings is preferably arranged to be attached to the bracket cover through one of the bearing retainers. The other bearing is attached to a bottom wall portion of the casing through the other bearing retainer.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 25A illustrates a state in which the bracket cover is not yet attached. FIG. 25B illustrates a state in which the bracket cover is undergoing an attaching process. FIG. 25C illustrates a state in which the bracket cover has been attached.

FIG. 26A illustrates a state in which the bracket cover is not yet attached. FIG. 26B illustrates a state in which the bracket cover is undergoing an attaching process. FIG. 26C illustrates a state in which the bracket cover has been attached.

FIG. 27A illustrates a state in which the bracket cover is undergoing an attaching process. FIG. 27B illustrates a state in which the bracket cover has been attached.

FIG. 28A illustrates a state in which the bracket cover is not yet attached. FIG. 28B illustrates a state in which the bracket cover has been attached.

DETAILED DESCRIPTION OF THE PREFERRED EMBODIMENTS

Preferred embodiments of the present invention will now be described in detail with reference to the accompanying drawings which form a part hereof. The description given below is nothing more than examples and is not intended to limit the present invention, the application thereof and the use thereof.

First Preferred Embodiment

Figure 1:
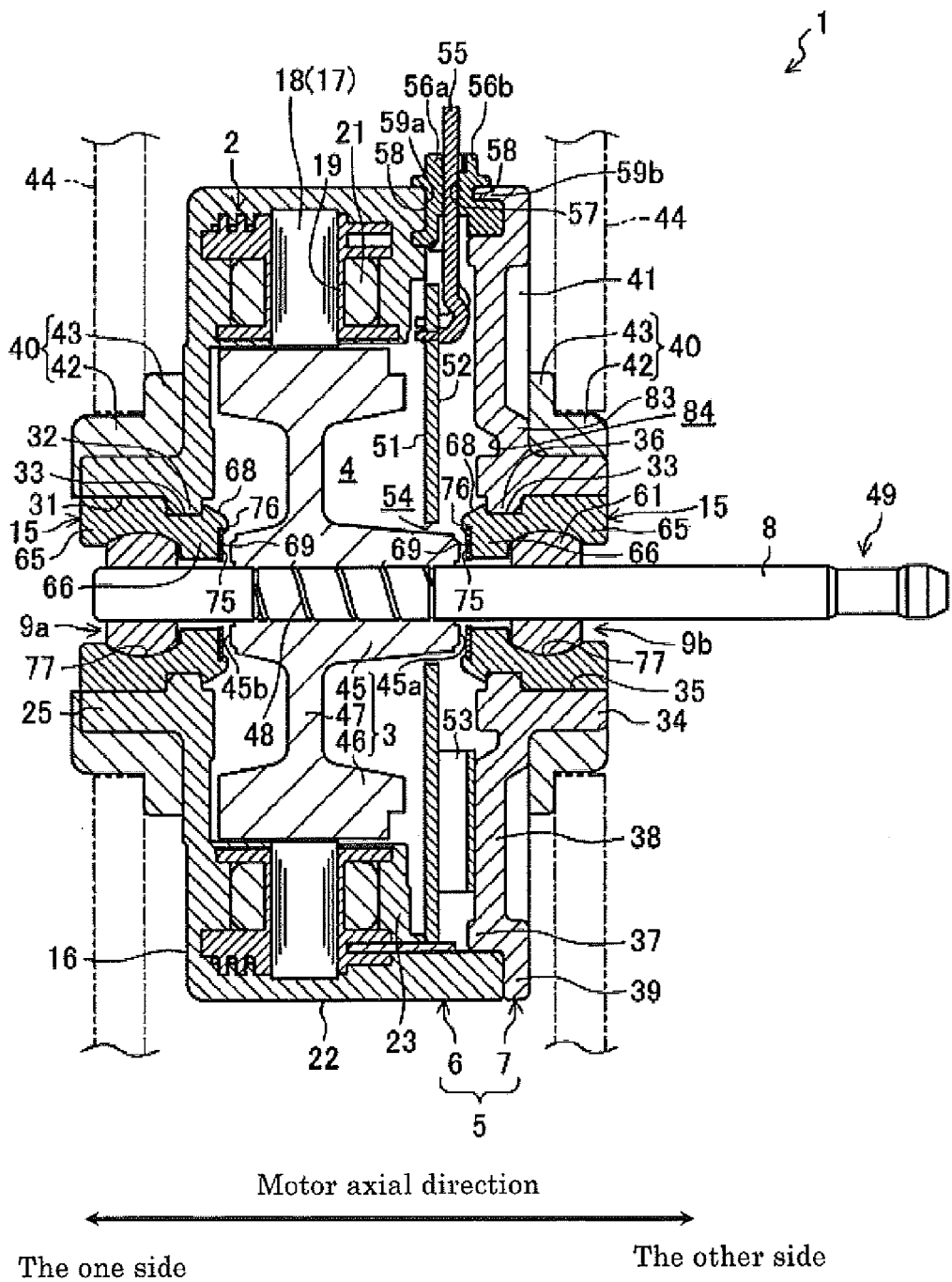
FIG. 1 is one preferred example of a section view showing a molded motor according to a first preferred embodiment of the present invention.
Figure 2:
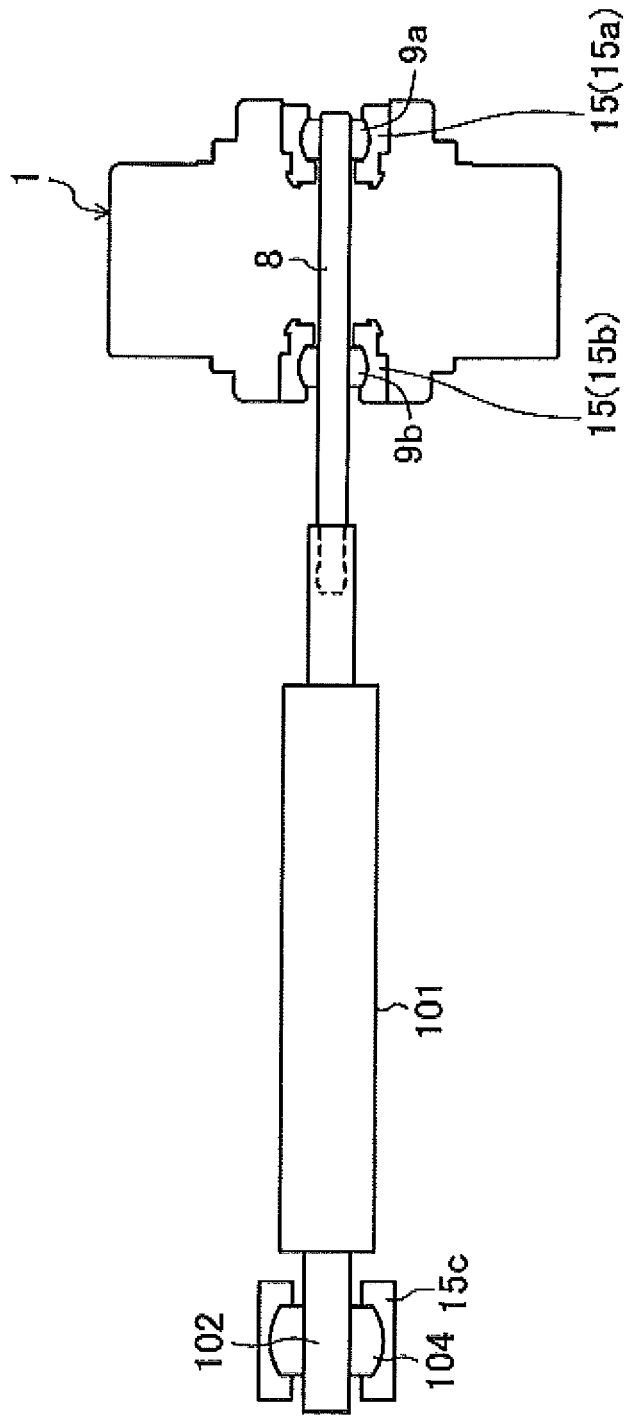
FIG. 2 is one preferred example of a schematic diagram illustrating a state in which the molded motor is connected to a cross flow fan.

FIG. 1 shows one preferred example of a molded motor 1 (hereinafter referred to as "motor 1") according to a first preferred embodiment of the present invention. FIG. 2 is one preferred example of a schematic diagram illustrating a state in which the molded motor is connected to a cross flow fan. The motor 1 is preferably a brushless DC motor. The motor 1 is arranged to drive, e.g., a cross flow fan 101 of an air conditioner indoor unit (see FIG. 2).

The motor 1 preferably includes a cylindrical stator 2. The motor 1 preferably includes a motor housing 5 including a storage space 4 arranged to store a rotor 3 therein. The motor housing 5 preferably includes a casing 6 and a bracket cover 7. The casing 6 is a tubular closed-bottom (preferably, cylindrical closed-bottom). The casing 6 opened at one axial side thereof. The bracket cover 7 is preferably substantially disc-shaped and arranged to cover the open side of the casing 6. However, the bracket cover 7 may be formed into other shapes, if such a need arises. The casing 6 preferably is made of a resin and is arranged to cover and embed the stator 2 therein preferably through, for example, molding. The casing 6 is integrally formed with the stator 2 as a single piece. The stator 2 has an exposed inner circumferential surface. The rotor 3 is coaxial or substantially coaxial with the stator 2 having an annular shape and is arranged radially inward of the stator 2. The rotor 3 preferably includes a shaft 8. The shaft 8 is preferably rotatably supported on the motor housing 5 through a pair of bearings 9a and 9b. The bearings 9a and 9b are covered at the radial outer sides by bearing retainers 15 and are kept in place by the bearing retainers 15. One bearing 9a is attached to a bottom wall portion 16 of the casing 6 through the bearing retainer 15. The other bearing 9b is attached to the bracket cover 7 through the bearing retainer 15. The tip end portion of the shaft 8 is serially connected to a support shaft 102 of a cross flow fan 101. The support shaft 102 of the cross flow fan 101 is supported at one end by a fan bearing 104.

The stator 2 preferably includes a ring-shaped stator core 17. The stator core 17 is preferably formed by laminating a plurality of steel plates punched into a specified shape, however, any other desirable stator forming method could be used. The stator core 17 preferably includes a plurality of tooth portions 18 arranged in a circumferential direction. The portions of the stator core 17 other than the inner circumferential surface and the outer circumferential surface are covered with an insulator 19. Stator coils 21 are wound on the respective tooth portions 18 through the insulator 19. The insulator 19 may have desirable any shape as long as it covers the area of the stator core 17 on which the stator coils 21 are wound.

The casing 6 as a whole is preferably made of a resin material. The casing 6 preferably includes a cylinder portion 22, a disc-shape bottom wall portion 16, and a ring-shaped motor cover portion 23. The cylinder portion 22 surrounds the outer circumference of the stator 2. The bottom wall portion 16 closes one axial side of the cylinder portion 22. The motor cover portion 23 covers the stator 2 at the side of the bracket cover 7. The stator 2 is surrounded by the inner circumferential surface of the cylinder portion 22, the bottom wall portion 16, and the motor cover portion 23. In the present preferred embodiment, unsaturated polyester is used as one preferred example of a resin for the casing 6.

A boss portion 25 arranged to protrude toward the axial outside of the motor 1 is provided in the central area of the bottom wall portion 16. A through-hole 31 is defined in the central axis area of the boss portion 25. The bearing retainer 15 is arranged in the through-hole 31. One bearing 9a is inserted into the through-hole 31 together with the bearing retainer 15. The bearing 9a is supported by the boss portion 25. A ring-shaped protrusion 32 protruding radially inward is provided on the inner circumferential surface of the boss portion 25 near the inner end of the boss portion 25. The protrusion 32 engages with a cover supported groove 33 arranged on the outer circumferential surface of the bearing retainer 15. Thus, the bearing retainer 15 is prevented from moving in the motor axial direction (the axial direction of the shaft 8).

Similarly, a boss portion 34 protruding toward the axial outside of the motor 1 is provided in the central area of the bracket cover 7. A through-hole 35 is defined in the central axis area of the boss portion 34. The bearing 9b is inserted into the through-hole 35 together with the bearing retainer 15 and is supported by the boss portion 34. A ring-shaped protrusion 36 is provided on the inner circumferential surface of the boss portion 34 near the inner end of the boss portion 34. The protrusion 36 engages with a cover supported groove 33 arranged on the outer circumferential surface of the bearing retainer 15. Thus, the bearing retainer 15 is prevented from moving in the motor axial direction.

The bracket cover 7 as a whole is preferably made of a resin material and is preferably formed by injection-molding, for example. The resin material of the bracket cover 7 is preferably the same as the resin material of the casing 6.

More specifically, as shown in FIGS. 1 and 2, the bracket cover 7 preferably includes not only the boss portion 34 but also a cylindrical portion 37 and a thin connecting portion 38. The cylindrical portion 37 is preferably press-fitted and fixed to the inner circumferential surface of the open-side end portion of the casing 6 (the cylinder portion 22). The connecting portion 38 interconnects the boss portion 34 and the cylindrical portion 37.

A flange portion 39 protruding radially outward is provided in the outer end portion of the cylindrical portion 37. The flange portion 39 is preferably arranged to make contact with the open-side end surface of the casing 6 (the cylinder portion 22) in a state where the bracket cover 7 is mounted to the casing 6. Accordingly, the position of the bracket cover 7 in the motor axial direction is readily adjusted when the bracket cover 7 is press-fitted to the casing 6.

Figure 3A:
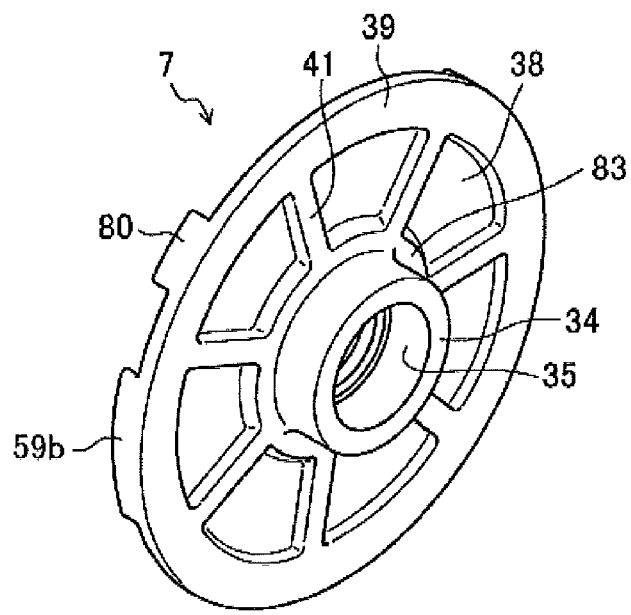
FIG. 3A is one preferred example of a perspective view of a bracket cover as seen from the inside of the molded motor.
Figure 3B:
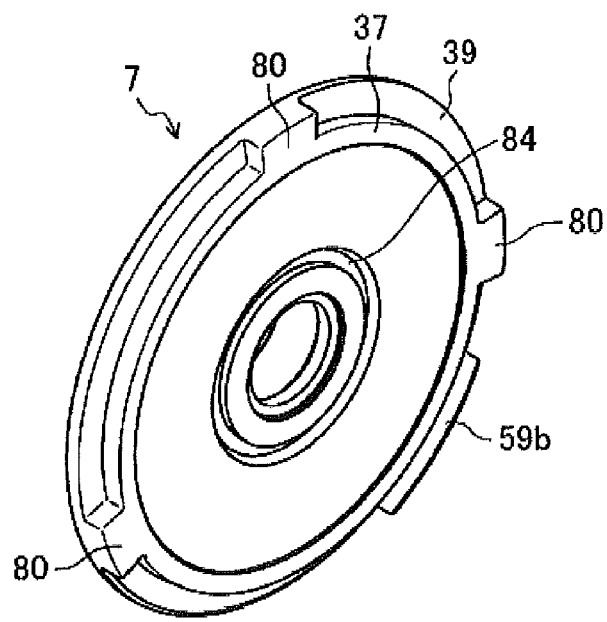
FIG. 3B is one preferred example of a perspective view of the bracket cover as seen from the outside of the molded motor.
Figure 4:
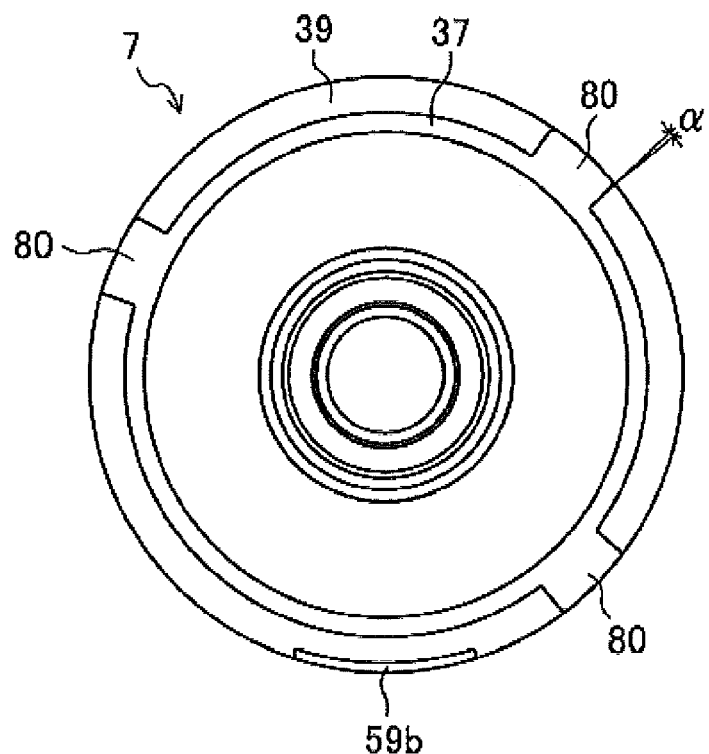
FIG. 4 is one preferred example of a plan view of the bracket cover as seen from the inside of the molded motor.

Three, for example, cover locking blocks 80 are arranged on the surface of the flange portion 39 that makes contact with the end surface of the casing 6 (see FIGS. 3A to 4). The cover locking blocks 80 are arranged at a specified interval along the circumferential direction. Three cover locking recesses 81 (see FIG. 6) are located in the open-side end surface of the casing 6. The cover locking blocks 80 are press-fitted to, and engaged with, the cover locking recesses 81. In this manner, the bracket cover 7 is positioned in the circumferential direction.

Referring to FIGS. 3A to 4, the cover locking blocks 80 extend radially outward from the outer circumferential surface of the cylindrical portion 37 to the outer edge of the flange portion 39. The height of the cover locking blocks 80 is preferably the same as or substantially the same as the height of the cylindrical portion 37. The inner end surfaces of the cover locking blocks 80 and the cylindrical portion 37 are continuously joined to each other and are flush with each other.

Each of the cover locking blocks 80 has a circumferentially-elongated rectangular shape when seen in the axial direction of the bracket cover 7. However, the cover locking blocks 80 can be rectangular or substantially rectangular but also may be square or trapezoidal, for example. The transverse opposite side surfaces of each of the cover locking blocks 80 are angled circumferentially outward as they extend from the radial inner side to the radial outer side of the bracket cover 7. The inclination angle α (see FIG. 4) is within a range of, e.g., about 2° to about 5°. Similarly, the circumferential opposite surfaces 81a of each of the cover locking recesses 81 of the casing 6 are angled transversely outward as they extend from the radial inner side to the radial outer side of the casing 6. The inclination angle β (see FIG. 6) is preferably a little smaller than the inclination angle α. By inclining the circumferential opposite surfaces of each of the cover locking blocks 80 in this manner, the cover locking blocks 80 is surely fixed to the cover locking recesses 81 through a wedge effect.

A plurality of ribs 41 are provided on the outer surface of the connecting portion 38. The ribs 41 are arranged to extend from the outer circumferential surface of the boss portion 34 to the inner circumferential surface of the cylindrical portion 37. The ribs 41 are arranged in a radial pattern about the boss portion 34. The ribs 41 increase the rigidity of the bracket cover 7, thereby restraining the shaft 8 from being or becoming off-centered during rotation.

Figure 5:
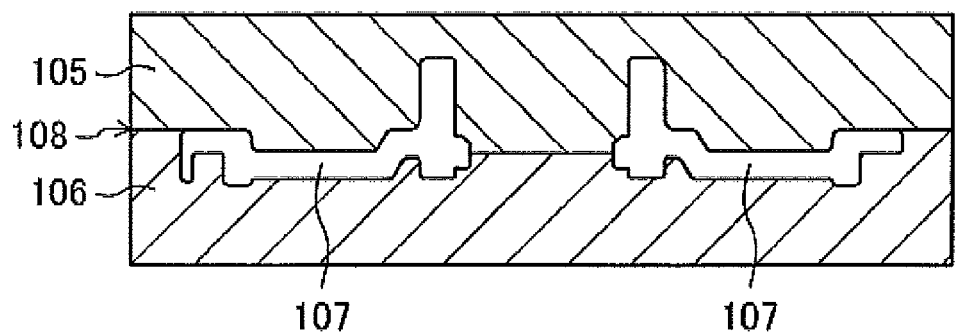
FIG. 5 is one preferred example of an explanatory view for explaining a bracket cover manufacturing method.

Next, one preferred example of a method of manufacturing the bracket cover 7 will be described. As shown in FIG. 5, the bracket cover 7 is preferably molded by injecting a resin material into a cavity 107 defined between an upper mold 105 and a lower mold 106. In the present preferred embodiment, the contact surface 108 of the upper mold 105 and the lower mold 106 is positioned precisely at the thickness direction center of the protrusion 36 of the bracket cover 7. Thus, a parting line (e.g., a molding line) appearing in a molded product is provided on portions other than the inner circumferential surface of the through-hole 35. This helps increase the assembling accuracy of the bearing retainer 15 with respect to the bracket cover 7 (hence, the assembling accuracy of the bearing 9b), thereby decreasing the shaft 8 from being off-centered.

In the meantime, a metal bracket cover is typically press-formed from the viewpoint of manufacturing cost and productivity. However, from the viewpoint of a manufacturing process, the number of stages of molds is greatly increased in order form a protrusion through press-forming. This is because the protrusion is formed on the inner circumferential surface of a through-hole. In the present preferred embodiment, however, the bracket cover 7 is preferably molded from a resin material. For that reason, the protrusion 36 is readily formed on the inner circumferential surface of the through-hole 35 at the inner side of the axial center position (the bearing 9b). This helps sufficiently increase the thickness of the bearing retainer 15 at the outer side of the bearing 9b. Accordingly, it is possible to enhance the alignment action of the shaft 8 and the vibration-reducing effect performed by the bearing retainer 15.

In case of press-forming a metallic material, due to the characteristics of the manufacturing process, the thickness direction opposite surfaces of the protrusion 36 are angled inward in the thickness direction as they extend toward the tip end of the protrusion 36. In other words, the protrusion 36 has a trapezoidal cross section. This impairs the function of axially positioning the bearing retainer 15, which is performed by the protrusion 36. In the present preferred embodiment, however, the bracket cover 7 is preferably molded with a resin material, which reduces the thickness direction opposite surfaces of the protrusion 36 from getting angled. This also reduces the bearing retainer 15 from being misaligned in the axial direction.

In the manufacturing process preferably using a thermosetting resin, radial inclination deformation is generated in the boss portion 34 when the thermosetting resin is cured within a cavity. This reduces the concentricity of the through-hole 35 defined inside the boss portion 34. In the motor 1 of the present preferred embodiment, an inner rib 83 raised toward the projecting side of the boss portion 34 is provided in the inner circumferential edge portion of the connecting portion 38 of the bracket cover 7. The inner rib 83 supports the base end portion of the boss portion 34. In this manner, the inner rib 83 prevents the boss portion 34 from becoming inclined in the curing process. This increases the radial rigidity of the boss portion 34. In this regard, a recess portion 84 is provided on the rear surface of the inner rib 83. This prevents the thickness of the inner rib 83 from becoming too large, thereby preventing poor molding.

An elastic member 40 made of, e.g., rubber, is arranged to be fitted to each of the boss portion 34 of the bracket cover 7 and the boss portion 25 of the casing 6. The elastic member 40 preferably includes a ring-shaped elastic base member 42 and a flange portion 43. The inner circumferential surface of the elastic base member 42 makes close contact with the outer circumferential surface of the boss portion 25. The flange portion 43 protrudes radially outward from one axial end of the elastic base member 42. The motor 1 is supported, through the elastic member 40, by a pair of motor-fixing brackets 44 arranged near a driven device.

The rotor 3 preferably includes a cylindrical inner tube portion 45, a cylindrical outer tube portion 46, and a disc-shaped connecting portion 47. The inner tube portion 45 is fixedly secured to the shaft 8. A magnetic force generated from the stator coils 21 acts directly on the outer tube portion 46. The connecting portion 47 interconnects the inner tube portion 45 and the outer tube portion 46. The rotor 3 is preferably formed by, for example, injection-molding a plastic-blended magnet resin. Alternatively, the rotor 3 may also be formed by, for example, bonding a plurality of split sintered magnets to the outer circumferential surface of a cylindrical yoke with an adhesive agent or the like. The inner tube portion 45 and the outer tube portion 46 preferably have a greatest radial thickness in the portions connected to the connecting portion 47. The radial thickness of the inner tube portion 45 and the outer tube portion 46 is gradually decreased as the inner tube portion 45 and the outer tube portion 46 extend toward the axial opposite ends thereof.

A helical groove portion 48 is defined on the surface of the shaft 8 fixed to the rotor 3. When injection-molding the rotor 3, for example, a magnet resin flows into the groove portion 48. Then, the shaft 8 and the rotor 3 are fixed to each other when the magnet resin cures within the helical groove portion 48. Thus, the rotor 3 is strongly fixed to the shaft 8 and is prevented from slipping on the shaft 8 and free-wheeling around the shaft 8. An attachment portion 49 arranged to be used in attaching the shaft 8 to a driven device is provided in the tip end portion of the shaft 8. The shape (preferably a step-like shape, in the present preferred embodiment) of the attachment portion 49 may be configured to arbitrarily conform to the shape of a counterpart attachment portion.

Figure 6:
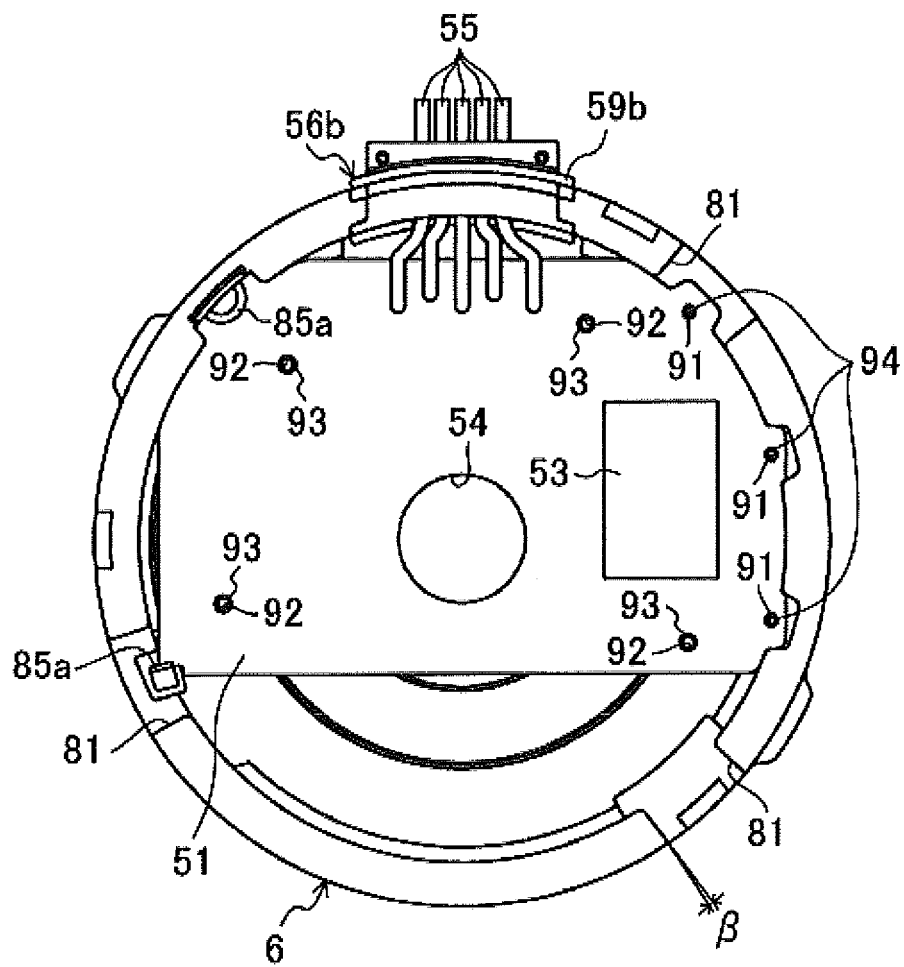
FIG. 6 is one preferred example of an axial plan view showing the molded motor with the bracket cover removed.

A control board 51 is preferably arranged between the bracket cover 7 and the rotor 3. As shown in FIG. 6, the control board 51 is arranged to be locked in place by claws 85a of two projections 85 protruding from the motor cover portion 23 toward the bracket cover 7. Each of the projections 85 is preferably monolithically defined with the insulator 19. The claws 85a are provided in the tip end portions of the projections 85.

The control board 51 preferably includes a motor drive circuit (not shown) arranged to perform, for example, PWM (Pulse Width Modulation) control to rotate the motor 1. The motor control circuit preferably includes an inverter circuit and a control circuit. The inverter circuit (not shown) feeds a drive current to the respective stator coils 21 of the motor 1. The control circuit controls the inverter circuit. The control board 51 is arranged in the motor 1 with a board surface 52 thereof facing toward the inner surface of the bracket cover 7. The board surface 52 is a surface on which the motor drive circuit is arranged. Not only the control circuit but also a substantially rectangular box-shaped control IC 53 is arranged on the board surface 52 of the control board 51. The control IC 53 may be contiguous to the inner surface of the bracket cover 7 when the bracket cover 7 is kept attached to the casing 6.

A circular hole 54 arranged to prevent the control board 51 from interfering with the inner tube portion 45 of the rotor 3 is preferably defined within the control board 51. The inner tube portion 45 passes through the circular hole 54 and protrudes toward the bracket cover 7 beyond the control board 51.

Figure 7:
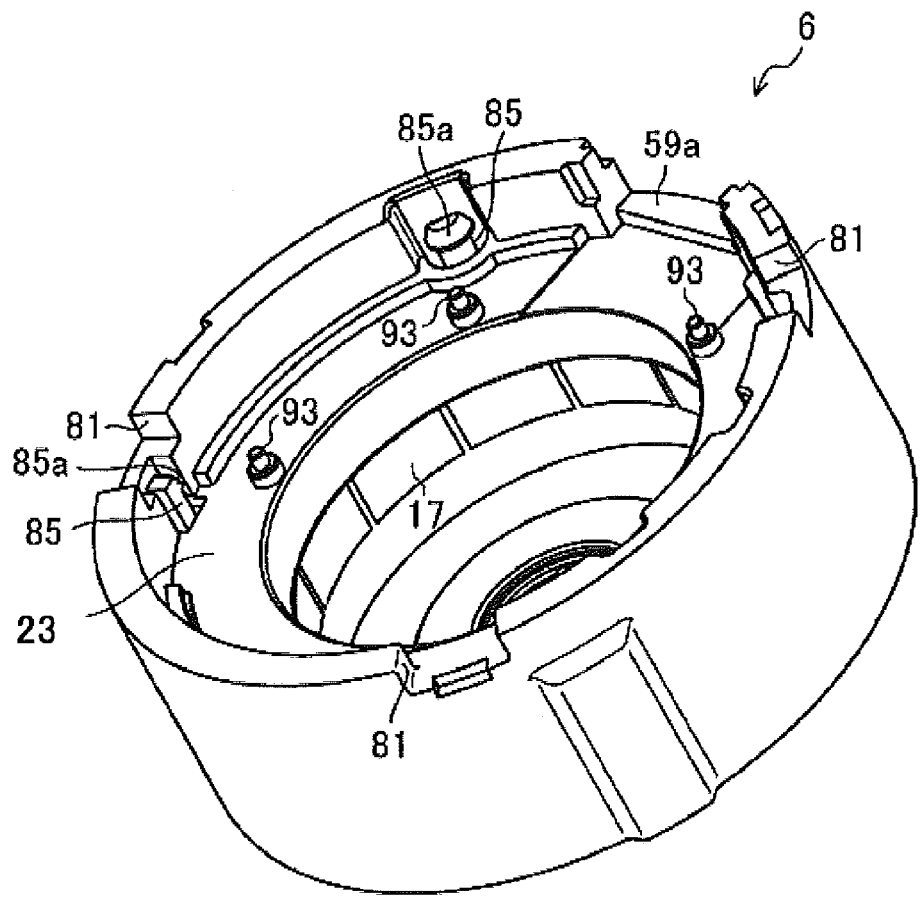
FIG. 7 is one preferred example of a perspective view of a casing as seen from the open side and the radial outer side thereof.
Figure 8:
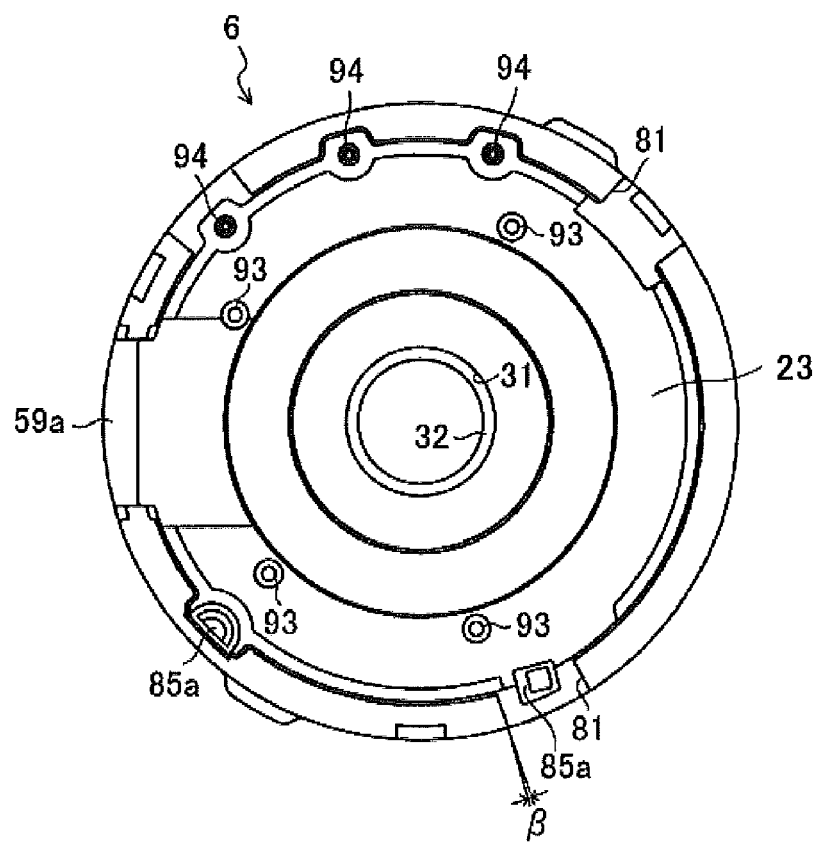
FIG. 8 is one preferred example of a plan view of the casing as seen from the open side thereof.

Three pin holes 91 and four cover locking holes 92 are preferably defined in the control board 51, though any other desirable numbers of pin holes 91 and cover locking holes 92 could be used. The pin holes 91 serve as electric connection terminals. The cover locking holes 92 are used for positioning purposes. Four cover locking pins 93 protrude from the surface of the motor cover portion 23 facing the bracket cover 7. The four cover locking pins 93 are arranged to be inserted into the four cover locking holes 92 (see FIGS. 6 through 8). Thus, the control board 51 is positioned in place within a plane perpendicular or substantially perpendicular to the shaft 8.

Three wiring pins 94 protrude from the surface of the motor cover portion 23 facing toward the bracket cover 7. The three wiring pins 94 are arranged to be inserted into the three pin holes 91 of the control board 51. The three wiring pins 94 are electrically connected to the stator coils 21. The motor drive circuit and the stator coils 21 are electrically connected to each other preferably by, for example, soldering the three wiring pins 94 to a specified conductor pattern of the control board 51.

Lead wires 55 arranged to supply electric power there through to respective circuits on the control board 51 are connected to the control board 51. The lead wires 55 are led out to the outside of the motor 1 from between the casing 6 and the bracket cover 7. Then, the lead wires 55 are connected a power source through a connector (see FIG. 6). A pair of bushings 56a and 56b is provided between the casing 6 and the bracket cover 7. The lead wires 55 are radially inserted and fixed between the bushings 56a and 56b. Wiring grooves 57 having a semicircular cross-sectional shape are preferably defined on the mutually-opposing surfaces of the bushings 56a and 56b. The lead wires 55 are led out to the outside of the motor 1 in a state that the lead wires 55 are inserted into the wiring grooves 57. Thus, the lead wires 55 are reliably fixed to the wiring grooves 57 and can be arranged in a specified direction. Engaging grooves 58 are defined on the surfaces of the bushings 56a and 56b opposite to the surfaces on which the wiring grooves 57 are defined. The bushing 56a is fixed to the casing 6 by bringing the engaging groove 58 thereof into engagement with an engaging protrusion 59a defined in the outer peripheral portion of the casing 6. The bushing 56b is preferably fixed to the bracket cover 7 by bringing the engaging groove 58 thereof into engagement with an engaging protrusion 59b provided in the outer peripheral portion of the bracket cover 7. In this manner, the bushings 56a and 56b are positioned in place in the motor radial direction.

Figure 9:
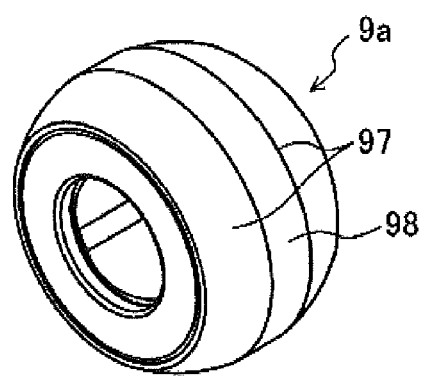
FIG. 9 is one preferred example of a perspective view of a sleeve bearing as seen from the inside of the molded motor.

The bearings 9a and 9b are preferably defined by, e.g., resin sleeve bearings (i.e., slide bearings). More specifically, each of the bearings 9a and 9b preferably includes a hollow tubular sleeve body 61 filled with a lubricant, such as grease. At least a portion of the outer circumferential surface of the sleeve body 61 is formed into a spherical shape. Preferably, spherical portions 97 are provided in axial opposite areas of the outer circumferential surface of the sleeve body 61. A cylindrical surface 98 is preferably provided in the intermediate area of the outer circumferential surface of the sleeve body 61 between the spherical portions 97 (see FIG. 9).

The inner circumferential surface of the sleeve body 61 preferably has a cylindrical shape. The shaft 8 is supported on the inner circumferential surface of the sleeve body 61 with a minute gap left therebetween. A plurality of fine holes is preferably defined on the inner circumferential surface of the sleeve body 61. Grease is thus supplied to the sliding surface of the shaft 8 through the fine holes.

The bearing retainer 15 is defined by an elastic body such as, for example, a rubber member. The hardness of the rubber member is preferably equal to about 40 HsA to about 80 HsA (JIS K 6253 durometer type A) and more preferably equal to about 60 has, for example. The material of the bearing retainer 15 is not limited to rubber but may alternately be, e.g., an elastomeric resin material.

Figure 10A:
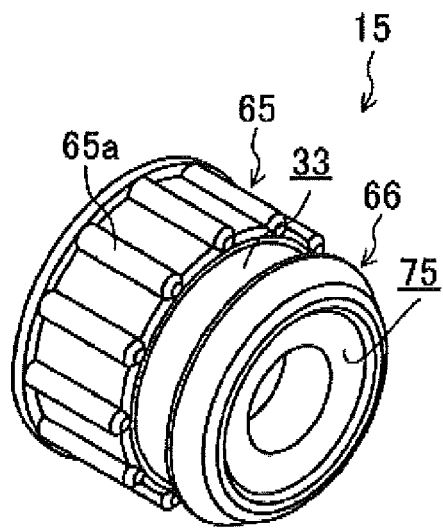
FIG. 10A is one preferred example of a perspective view of a bearing retainer as seen from the tip end side thereof (from the inside of the molded motor).
Figure 10B:
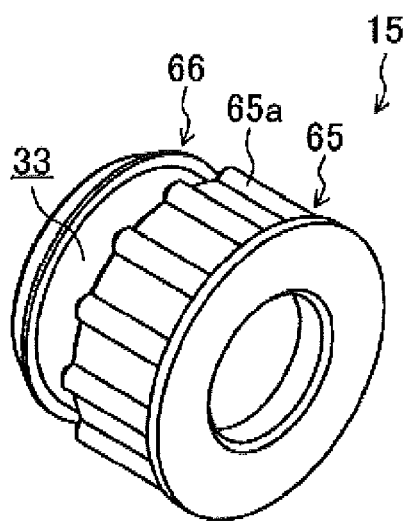
FIG. 10B is one preferred example of a perspective view of the bearing retainer as seen from the base end side thereof (from the outside of the molded motor).

The bearing retainer 15 preferably includes a large-diameter tube portion 65 and a small-diameter tube portion 66. The large-diameter tube portion 65 is preferably press-fitted to the through-hole 31 of the casing 6 or the through-hole 35 of the bracket cover 7. The center axis of the small-diameter tube portion 66 is preferably arranged to coincide with the center axis of the large-diameter tube portion 65. A plurality of axially-extending columnar portions 65a (see FIGS. 10A and 10B) is defined in the outer circumferential portion of the large-diameter tube portion 65. The columnar portions 65a are arranged at a regular interval along the circumferential direction of the large-diameter tube portion 65. Thus, the outer circumferential surface of the large-diameter tube portion 65 preferably has a spline shape. Accordingly, the sliding resistance of the outer circumferential surface of the large-diameter tube portion 65 and the inner circumferential surface of the through-hole 31 or 35 is reduced in the process of press-fitting the large-diameter tube portion 65 into the through-hole 31 or 35. This facilitates the process of press-fitting the large-diameter tube portion 65.

A spherical holding portion 77 is preferably provided on the inner circumferential surface of the large-diameter tube portion 65. The spherical holding portion 77 is arranged to slidably hold the outer circumferential surface of the bearing 9a or 9b (the sleeve body 61). A cover supported groove 33 is preferably defined on the area of the outer circumferential surface of the small-diameter tube portion 66 adjoining to the large-diameter tube portion 65, to extend over the full perimeter of the small-diameter tube portion 66. A chamfered portion 68 is provided in the tip end area of the small-diameter tube portion 66. This enables the tip end area of the small-diameter tube portion 66 to easily pass through the inside of the protrusion 32 or 36 in the assembling process of the bearing retainer 15. A circular hole 75 preferably arranged to accommodate a nylon washer 69 is defined on the tip end surface of the small-diameter tube portion 66. The washer 69 arranged to be inserted into the circular hole 75 is preferably locked in position by a locking piece 76. The locking piece 76 protrudes a little bit toward the radial inner side of the circular hole 75 from the tip end surface of the small-diameter tube portion 66. The washer 69 is not limited to be made of nylon and could instead be made of any other suitable material. For example, the washer 69 could also be made of polytetrafluoroethylene (PTFE).

The distance between the end surface 45a of the inner tube portion 45 of the rotor 3 facing toward the bracket cover 7 and the washer 69 opposing to the end surface 45a is preferably smaller than the distance between the outer tube portion 46 of the rotor 3 and the control board 51. The distance between the end surface 45b of the inner tube portion 45 of the rotor 3 facing toward the bottom wall portion 16 of the casing 6 and the washer 69 opposing to the end surface 45b is preferably smaller than the distance between the outer tube portion 46 of the rotor 3 and the bottom wall portion 16.

When assembling the motor 1, a worker preferably initially prepares the casing 6 in which the stator 2 is embedded by covering the same with a resin. Then, the worker preferably assembles the bearing 9a and the washer 69 with the bearing retainer 15. Subsequently, the worker has the bearing retainer 15 press-fitted into the through-hole 31 of the boss portion 25 from one side toward the other side in the motor axial direction. The worker brings the protrusion 32 into engagement with the cover supported groove 33 of the bearing retainer 15, thereby finishing the press-fitting process of the bearing retainer 15. Then, the worker inserts the shaft 8, to which the rotor 3 is fixed as a single integral unit, into the inner circumferential surface of the bearing 9a previously assembled.

After fitting the shaft 8 to the bearing 9a, the worker assembles the control board 51 with the casing 6 from the other side in the motor axial direction. At the same time, the worker assembles the bushing 56a with the casing 6. Then, the lead wires 55 are inserted into the wiring grooves 57. After arranging the lead wires 55, the worker assembles the bushing 56b together with the bushing 56a to cover the lead wires 55. Then, while keeping the bushings 56a and 56b restrained against misalignment, the worker assembles the bracket cover 7 to the casing 6 from the other side in the motor axial direction so that the bracket cover 7 will cover the open-side of the casing 6. At this time, it is desirable if the bearing retainer 15 carrying the bearing 9b and the washer 69 is assembled with the bracket cover 7 in advance. In this case, the shaft 8 is inserted into the inner circumferential surface of the bearing 9b as the bracket cover 7 is assembled with the casing 6. Thus, the process of assembling the motor 1 is finished. While the assembling process stated above is performed by a worker, there is essentially no change in the assembling process even if the motor 1 is assembled by a machine.

In this regard, if the bracket cover is made of a metallic material as in the conventional molded motor, there is a possibility that the bearing will suffer from electric corrosion due to the voltage change caused by the PWM control. In the present preferred embodiment, however, the bracket cover 7 is preferably made of a resin material (namely, an electrically insulating material). Thus, an electric potential difference is generated between the bracket cover 7 and the stator core 17. This makes it possible to prevent or substantially prevent the bearing 9b from suffering from electric corrosion.

In the present preferred embodiment, the bearing retainer 15 is preferably made of a rubber material as an electrically insulating body and the bearing 9b is made of a resin material. Accordingly, it is possible to reduce electric corrosion of the bearing 9b.

If the bracket cover 7 is made of a resin material in this manner, it is often the case that processing accuracy will become lower as compared with a case where the bracket cover 7 is made of a metallic material. This leads to a decrease in the outer diameter accuracy of the cylindrical portion 37 of the bracket cover 7, which sometimes results in an increase in the assembling error of the bracket cover 7 with respect to the casing 6 (e.g., an increase in the deviation of concentricity of the elements of the motor). It is also sometimes the case that the diameter accuracy of the through-hole 35 arranged to attach the bearing 9b to the bracket cover 7 grows lower. This sometimes results in an increase in the assembling error of the bearing 9b with respect to the bracket cover 7. In case of using the resin bracket cover 7, therefore, there is a case that the assembling errors noted above are accumulated to such an extent that the degree of off-centering of the shaft 8 exceeds a permissible level. This sometimes leads to a sharp decrease in the rotation accuracy of the shaft 8.

In the present preferred embodiment, however, the outer circumferential surface of the bearing 9b preferably has a spherical shape so that the bearing 9b can be slidably held by the spherical holding portion 77 of the bearing retainer 15. As a result, the shaft 8 is arranged to perform self-alignment even when off-centered. This makes it possible to limit a reduction of the rotation accuracy of the shaft 8.

Moreover, the elasticity of the bearing retainers 15 absorbs the fitting error of the casing 6 and the bearing 9a and the fitting error of the bearing 9b and the bracket cover 7, which are caused by the reduction of the processing accuracy. The stator 2 and the rotor 3 are aligned at the center of a rotation axis by the circumferential balance of a repelling magnetic force and an attracting magnetic force. At this time, the bearing retainer 15 is deformed in the aligning direction of the rotor 3. This is because the bearing retainer 15 is made of an elastic body.

In the present preferred embodiment, sleeve bearings (i.e., slide bearings) are used as the bearings 9a and 9b. This reduces noises generated during the motor operation, as compared with a case where rolling bearings are used.

In the present preferred embodiment, the casing 6 and the bracket cover 7 are made of the same resin material, which means that the linear expansion coefficients of the casing 6 and the bracket cover 7 are preferably set equal to each other. Thus, the fitting accuracy of the casing 6 and the bracket cover 7 can be kept constant or substantially constant even if the radial dimensions of the casing 6 and the bracket cover 7 are changed by the heat generated during the motor operation (e.g., the frictional heat of the bearings 9a and 9b). Accordingly, it is possible to prevent reduction of the rotation accuracy of the shaft 8 and reduction of the fitting strength, which may be caused by the reduction of the fitting accuracy of the casing 6 and the bracket cover 7.

In the present preferred embodiment, the nylon washer 69 is provided on the tip end surface of the bearing retainer 15. For example, even if a load is applied from a driven device to the shaft 8 in the motor axial direction and even if the rotor 3 is axially moved together with the shaft 8, the rotor 3 makes sliding contact with the washer 69. Accordingly, it is possible to limit the rotor 3 from making contact with the bottom wall portion 16 of the casing 6 and consequently generating strange or undesirable noises when the rotor 3 is axially moved. It is also possible to reduce the rotor 3 from making contact with the control board 51 and consequently breaking the control board 51.

In the present preferred embodiment, the hardness of the bearing retainer 15 is preferably equal to about 40 HsA to about 80 HsA (and more preferably equal to about 60 HsA). This helps increase the effect of aligning the shaft 8, which is provided by the bearing retainer 15. The present inventors have discovered that, if the hardness of the bearing retainer 15 is too high, the spherical portions 97 of the bearings 9a and 9b are hard to slide within the spherical holding portions 77. Furthermore, the present inventors have discovered that, if the hardness of the bearing retainer 15 is too low, the spherical portions 97 of the bearings 9a and 9b are slid too much within the spherical holding portions 77, which makes it impossible to obtain the desired aligning effect. The present inventors have conducted extensive research and obtained test results revealing that, if the hardness of the bearing retainer 15 is set equal to about 40 HsA to about 80 HsA, the effect of aligning the shaft 8 shows a drastic increase. Based on the test results, the hardness of the bearing retainer 15 is preferably equal to about 60 HsA in the motor 1 of the present preferred embodiment, for example. This helps avoid an increase in the off-centering error of the shaft 8 which may otherwise be caused by the use of the resin bracket cover 7, thereby realizing increased rotation accuracy.

Second Preferred Embodiment

Figure 11:
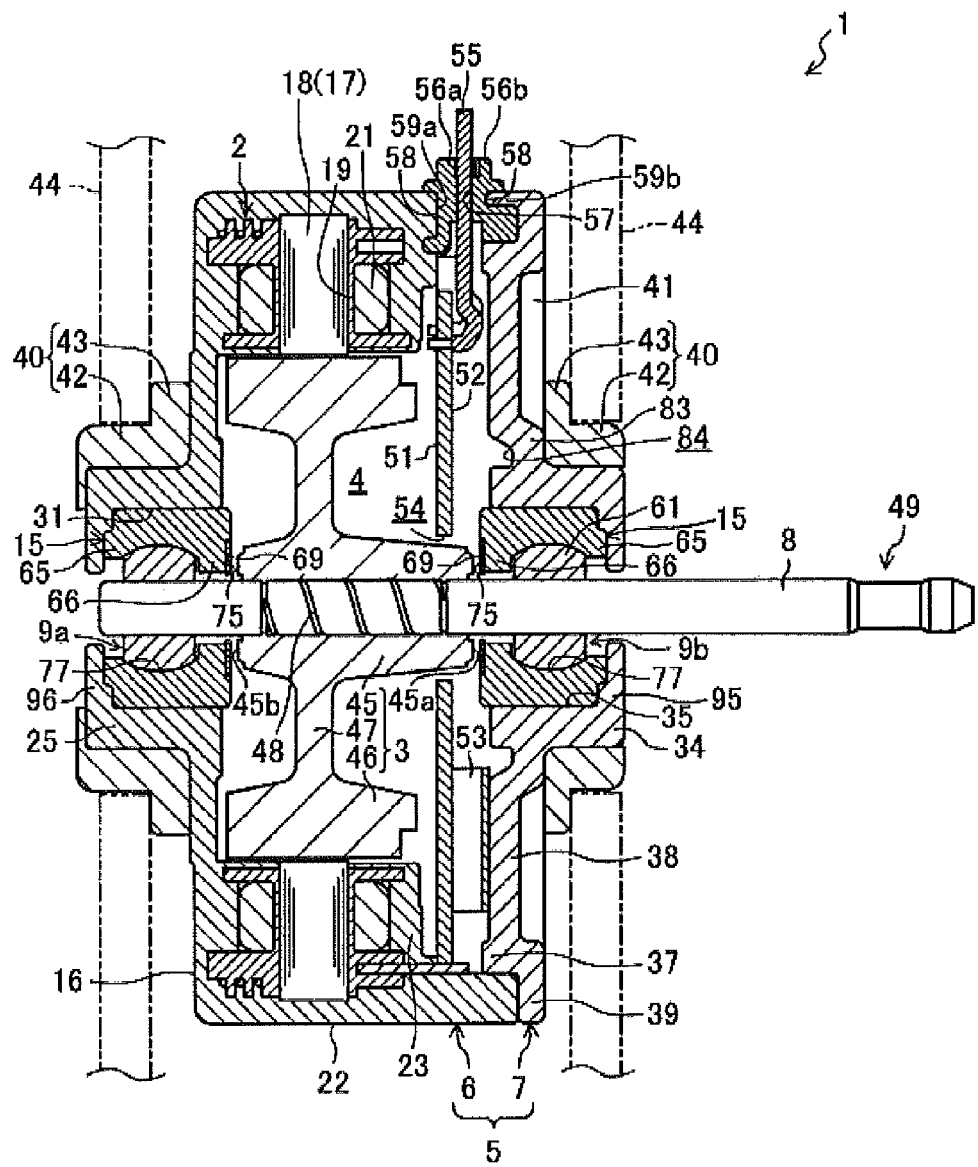
FIG. 11 is one preferred example of a section view showing a molded motor according to a second preferred embodiment of the present invention.

FIG. 11 shows one preferred example of a second preferred embodiment of the present invention. The motor of the second preferred embodiment differs from the motor of the first preferred embodiment in terms of the configurations of the bearing retainer 15, the bracket cover 7, and the casing 6. In the following description, the components substantially identical with those shown in FIG. 1 will be designated by like reference symbols and will not be described in detail, if appropriate.

In the second preferred embodiment, unlike the first preferred embodiment, the bearing retainer 15 preferably has a cylindrical shape having a constant outer diameter. No cover supported groove 33 is defined on the outer circumferential surface of the bearing retainer 15. A disc-shaped contact portion 95 is arranged in the outer end portion of the boss portion 34 of the bracket cover 7. The contact portion 95 protrudes radially inward and makes contact with the end surface of the bearing retainer 15. Similarly, a contact portion 96 protruding radially inward is provided in the outer end portion of the boss portion 25 of the casing 6.

Description will now be made on one preferred example of a process of assembling the motor 1 according to the second preferred embodiment. The same steps as those of the first preferred embodiment will not be described in detail. First, a worker preferably prepares the casing 6 in which the stator 2 is embedded by covering the same with a resin. Then, the worker preferably assembles the bearing 9a and the washer 69 with the bearing retainer 15. Subsequently, the worker has the bearing retainer 15 press-fitted into the through-hole 31 of the boss portion 25 from the other side toward the one side in the motor axial direction. The worker brings the end surface of the bearing retainer 15 into contact with the contact portion 96 of the casing 6, thereby finishing the press-fitting process of the bearing retainer 15.

Then, the worker inserts the shaft 8, to which the rotor 3 is fixed as a single integral unit, into the inner circumferential surface of the bearing 9a previously assembled. After fitting the shaft 8 to the bearing 9a, the worker assembles the control board 51 and the bushings 56a and 56b with the casing 6 from the other side in the motor axial direction. Then, while keeping the bushings 56a and 56b restrained against misalignment, the worker assembles the bracket cover 7 to the casing 6 from the other side in the motor axial direction so that the bracket cover 7 can cover the open-side of the casing 6. At this time, it is desirable if the bearing retainer 15 carrying the bearing 9b and the washer 69 is assembled with the bracket cover 7 in advance. In this case, the shaft 8 is inserted into the inner circumferential surface of the bearing 9b as the bracket cover 7 is assembled with the casing 6. Thus, the process of assembling the motor 1 is finished.

In the second preferred embodiment, as set forth above, all the assembling steps can be performed at the same side in the motor axial direction (at the other side in the motor axial direction). Thus, the process of assembling the motor 1 becomes easy to perform. While the assembling process is preferably performed by a worker in the second preferred embodiment, there is essentially no change in the assembling process even if the motor is assembled by a machine.

Third Preferred Embodiment

Figure 12:
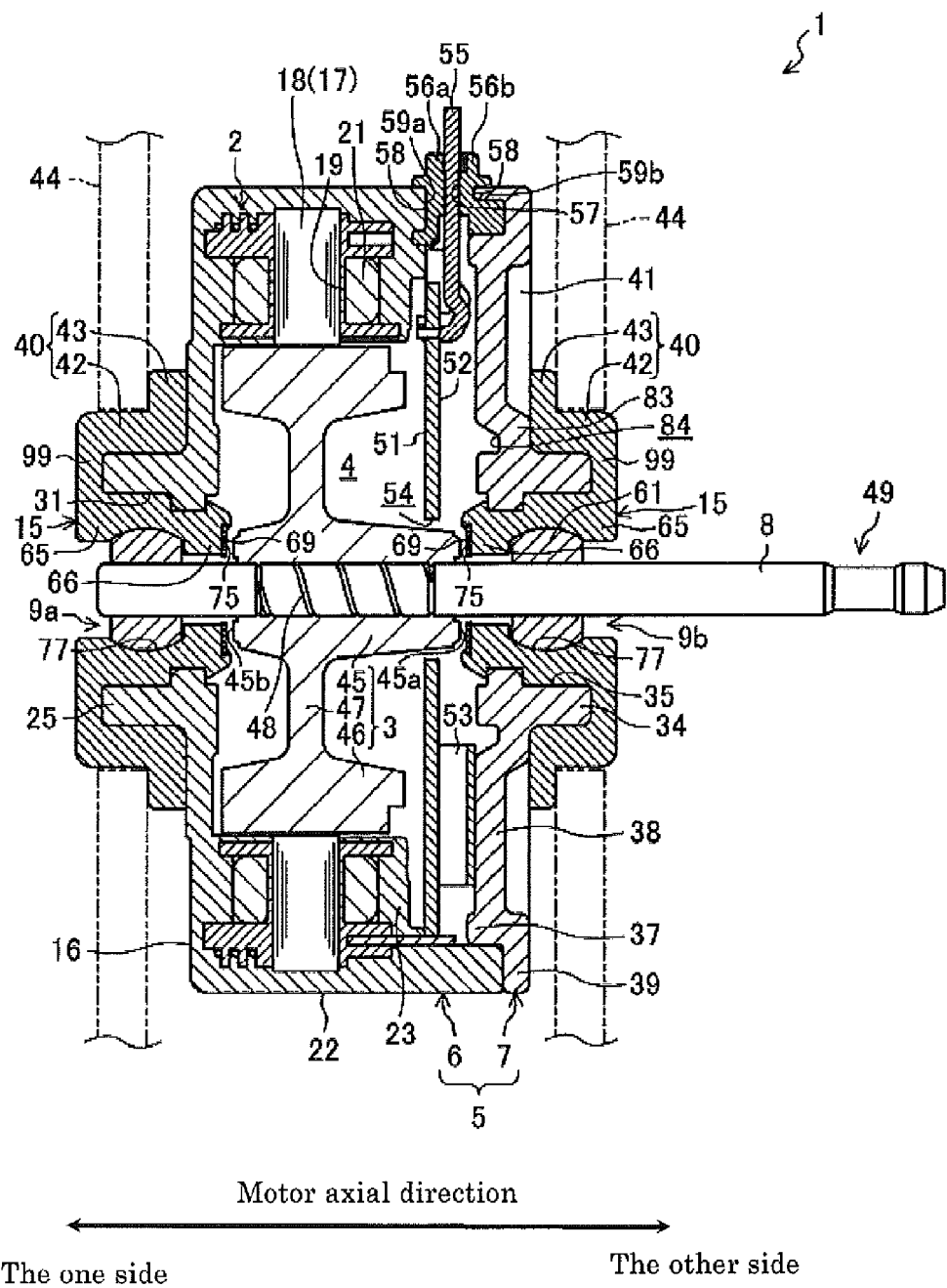
FIG. 12 is one preferred example of a section view showing a molded motor according to a third preferred embodiment of the present invention.

FIG. 12 shows a third preferred embodiment of the present invention. The third preferred embodiment differs from the first preferred embodiment in terms of the configuration of the elastic member 40. The motor 1 of the third preferred embodiment preferably includes a connecting portion 99 united together with the bearing retainer 15 and the elastic member 40 as a single monolithic element. This reduces the number of motor assembling steps and the number of parts, thereby making the motor 1 less costly.

Fourth Preferred Embodiment

The fourth preferred embodiment of the present invention differs from the foregoing preferred embodiments in terms of the hardness relationship between a pair of bearing retainers 15a and 15b arranged to hold the bearings 9a and 9b and a bearing retainer 15c arranged to hold the fan bearing 104.

Comparing the hardness of the respective bearing retainers 15 (15a, 15b, and 15c, as shown in FIG. 2), the hardness of the bearing retainer 15a for the bearing 9a supporting the base end portion of the shaft 8 and the hardness of the bearing retainer 15c for the fan bearing 104 are set equal or substantially equal to each other. On the other hand, the hardness of the bearing retainer 15b for the bearing 9b positioned between the fan bearing 104 and the bearing 9a is set lower than the hardness of the bearing retainer 15c. Thus, the side of the bearing 9a and the side of the fan bearing 104 (namely, the opposite end sides in the motor axial direction) become the base of the center axis. As a result, the bearing 9b positioned at the center has a function of aligning the shaft 8. This significantly increases the rotation accuracy of the shaft 8.

Fifth Preferred Embodiment

Figure 13:
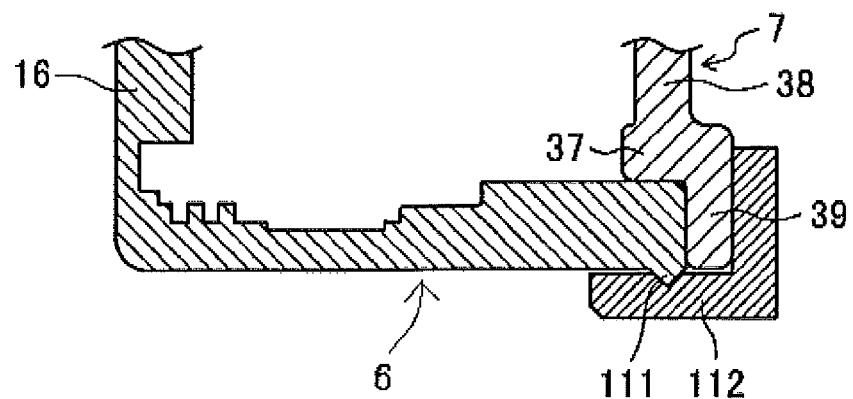
FIG. 13 is one preferred example of a section view illustrating a bracket cover attaching structure according to a fifth preferred embodiment of the present invention.

FIG. 13 shows one preferred example of a fifth preferred embodiment. The fifth preferred embodiment differs from the foregoing preferred embodiments in terms of the structure arranged to attach the bracket cover 7 to the casing 6.

In the fifth preferred embodiment, an engaging protrusion 111 having a triangular cross-sectional shape is arranged to extend over the entire perimeter of the outer circumferential surface of the casing 6. An engaging piece 112 arranged to engage with the engaging protrusion 111 is provided in the outer peripheral portion of the bracket cover 7. In the example shown in FIG. 13, the engaging protrusion 111 is integrally provided as a single piece with the casing 6. The engaging piece 112 is fixed to the bracket cover 7 preferably by, for example, insert molding (or bonding).

With the fifth preferred embodiment, the bracket cover 7 is strongly fixed to the casing 6.

Sixth Preferred Embodiment

Figure 14:
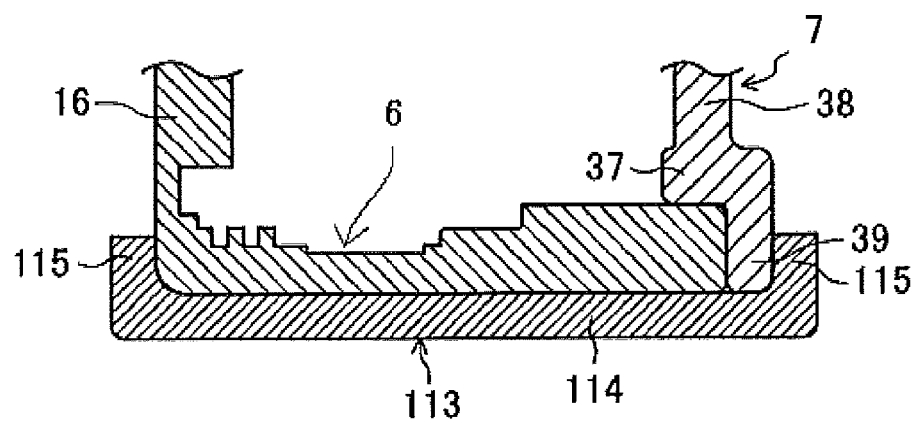
FIG. 14 is one preferred example of a section view illustrating a bracket cover attaching structure according to a sixth preferred embodiment of the present invention.

FIG. 14 shows one preferred example of a sixth preferred embodiment. The sixth preferred embodiment differs from the foregoing preferred embodiments in terms of the structure arranged to attach the bracket cover 7 to the casing 6.

In the sixth preferred embodiment, a fixing member 113 is mounted to the casing 6 and the bracket cover 7 from the radial outer side when the bracket cover 7 is press-fitted to the casing 6. In this example, the fixing member 113 preferably includes a strip-shaped plate 114 and a pair of fixing pieces 115. The strip-shaped plate 114 extends in the motor axial direction along the outer circumferential surface of the casing 6. The fixing pieces 115 are provided in the longitudinal opposite end portions of the strip-shaped plate 114. The fixing pieces 115 grip the bottom wall portion 16 of the casing 6 and the bracket cover 7 at the opposite sides in the motor axial direction. The fixing member 113 is preferably injection-molded using, e.g., a resin material. As a result, just like the fifth preferred embodiment, the bracket cover 7 is strongly fixed to the casing 6.

Seventh Preferred Embodiment

Figure 15:
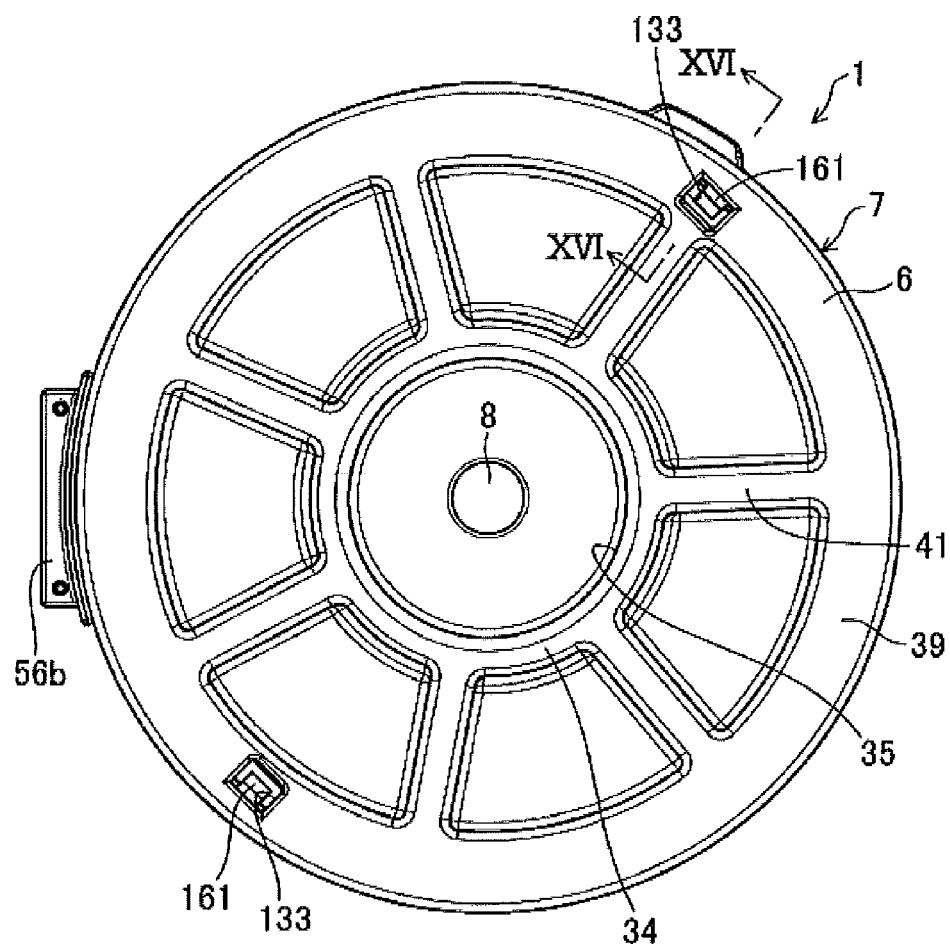
FIG. 15 is one preferred example of an axial plan view illustrating a bracket cover attaching structure according to a seventh preferred embodiment of the present invention.
Figure 16:
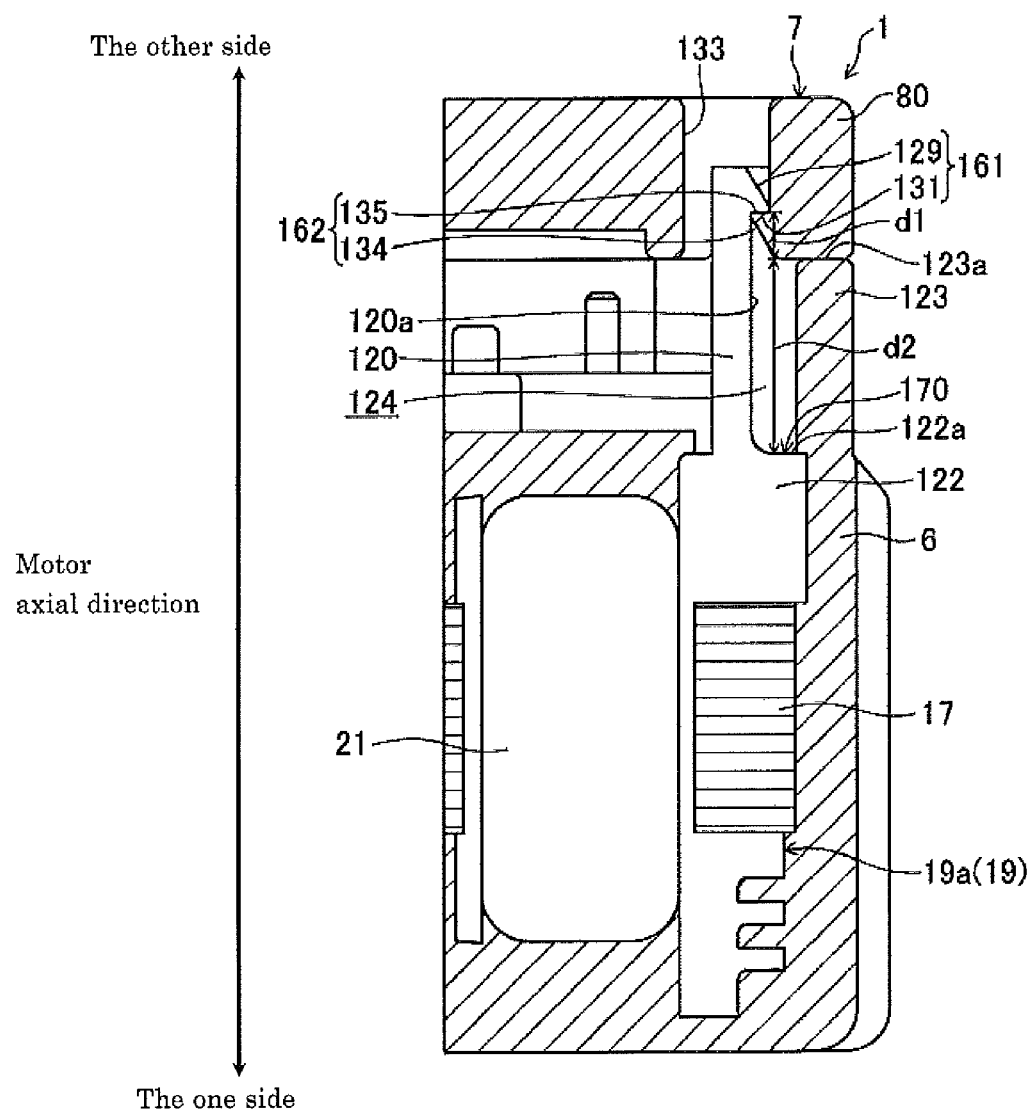
FIG. 16 is one preferred example of a section view taken along line XVI-XVI in FIG. 15, illustrating the bracket cover attaching structure according to the seventh preferred embodiment of the present invention.

FIGS. 15 and 16 show one preferred example of a seventh preferred embodiment of the present invention. The seventh preferred embodiment differs from the foregoing preferred embodiments in terms of the structure arranged to attach the bracket cover 7 to the casing 6.

In the seventh preferred embodiment, two fixing extension portions 120 (see FIG. 16) are defined in the insulator 19 covering the stator core 17. A claw 161 is arranged at the tip end of each of the fixing extension portions 120. The bracket cover 7 is fixed to the casing 6 using the claw 161. In the following description, the terms "axial outer side" and "axial inner side" mean the outer side and the inner side in the motor axial direction, respectively. The terms "radial outer side" and "radial inner side" denote the outer side and the inner side in the motor radial direction, respectively. Unless specifically mentioned otherwise, the following description is made of the assumption that the bracket cover 7 is attached to the casing 6.

Figure 17:
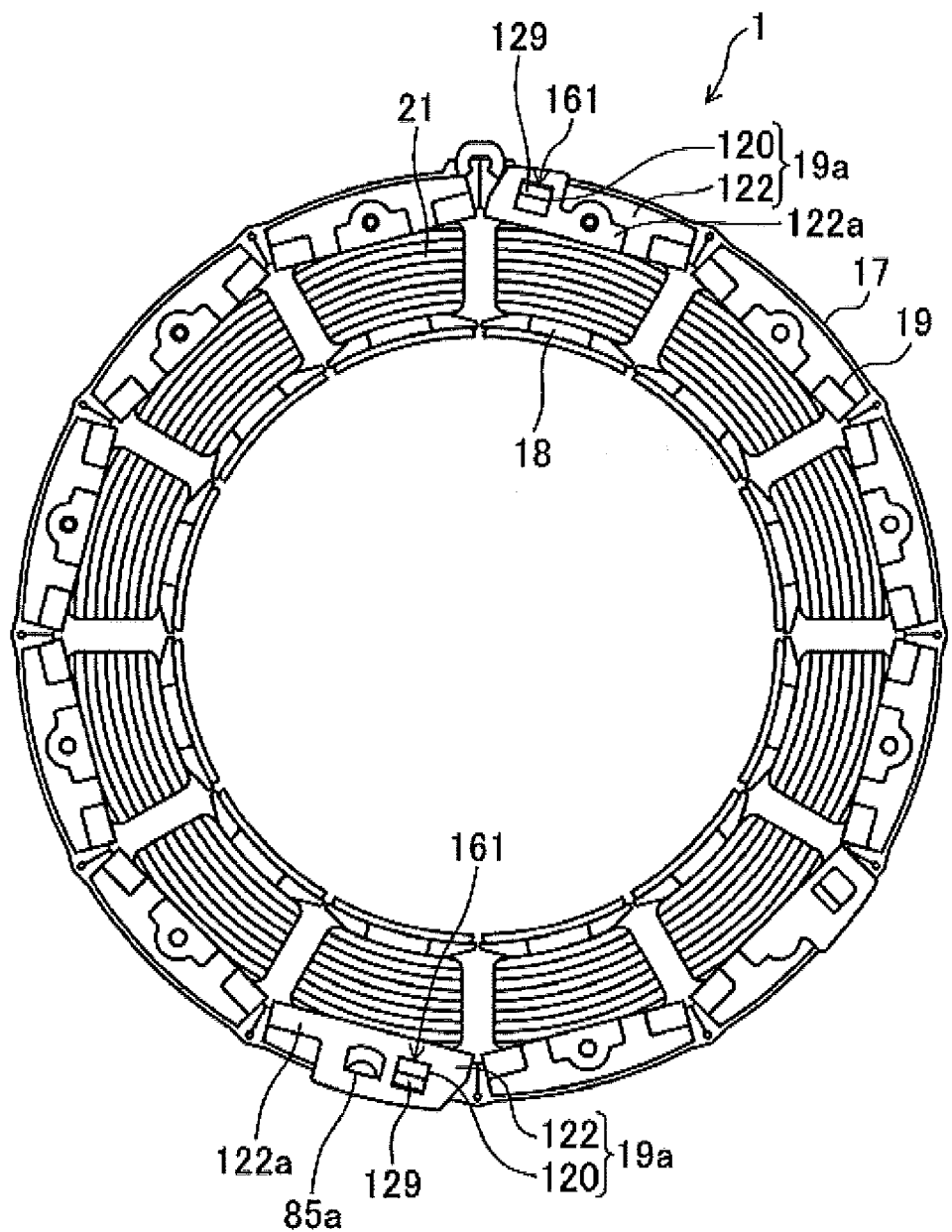
FIG. 17 is one preferred example of an axial plan view showing a stator of a molded motor according to the seventh preferred embodiment of the present invention.

As shown in FIG. 17, the fixing extension portions 120 are respectively provided in two insulators 19a opposing to each other in the motor radial direction. Each of the insulators 19a preferably includes an insulator body 122 having a T-shaped configuration when the stator core 17 is seen in the axial direction. Each of the fixing extension portions 120 extends from the end surface 122a of the insulator body 122 toward the bracket cover 7 in the axial direction. Each of the insulator bodies 122 and each of the fixing extension portions 120 are preferably molded with each other as a single monolithic element using a thermoplastic resin.

Figure 18:
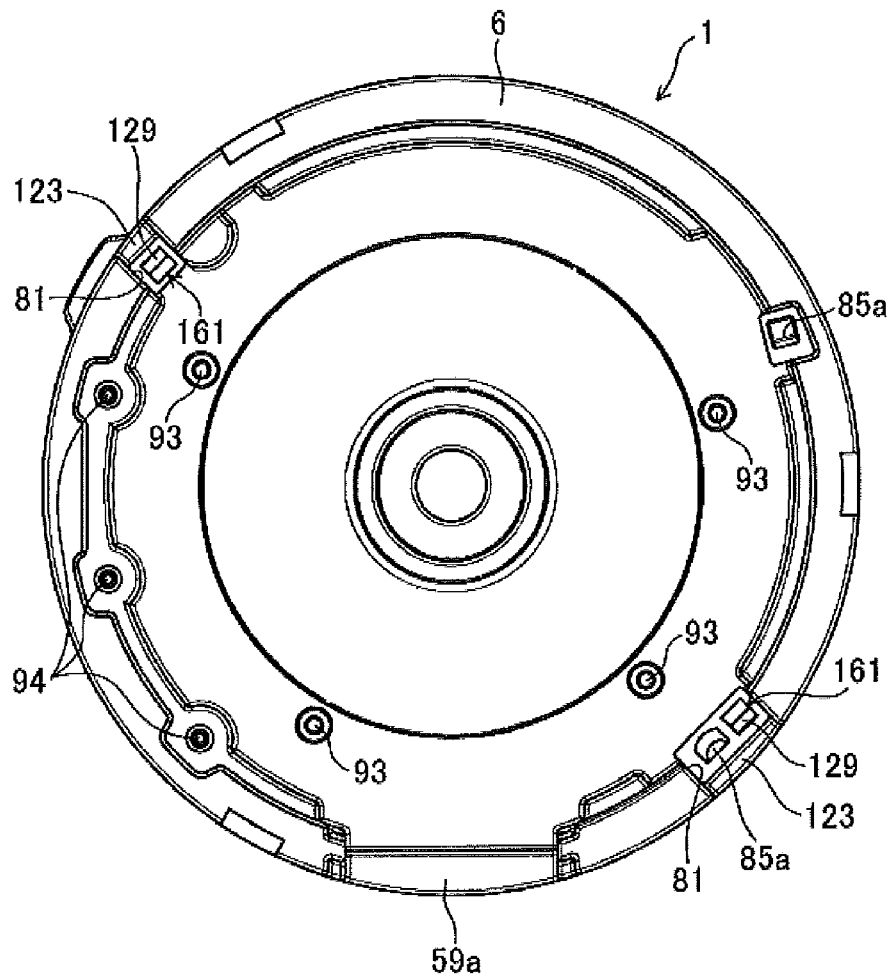
FIG. 18 is one preferred example of a plan view showing a casing according to the seventh preferred embodiment of the present invention, which is seen from the open side.

Referring to FIG. 18, two cover locking recesses 81 are arranged on the open-side end surface of the casing 6. When seen in the axial direction, the two cover locking recesses 81 are provided in the same phase positions as the two insulators 19a in the motor circumferential direction. The tip end surface of each of the cover locking blocks 80 makes contact with the bottom wall surface of each of the cover locking recesses 81 (the tip end surface 123a of a thin wall 123) (see FIG. 16). The thickness of the outer peripheral wall of the casing 6 in the portions where the cover locking recesses 81 are provided is smaller than the thickness in the remaining portions.

The respective fixing extension portions 120 are arranged adjacent to the radial inner surface of the thin wall 123. The fixing extension portions 120 are positioned within the cover locking recesses 81 (see FIG. 18). Each of the fixing extension portions 120 is defined by a columnar body having a rectangular cross-sectional shape, for example. The thickness direction of each of the fixing extension portions 120 coincides with the motor radial direction.

Figure 19:
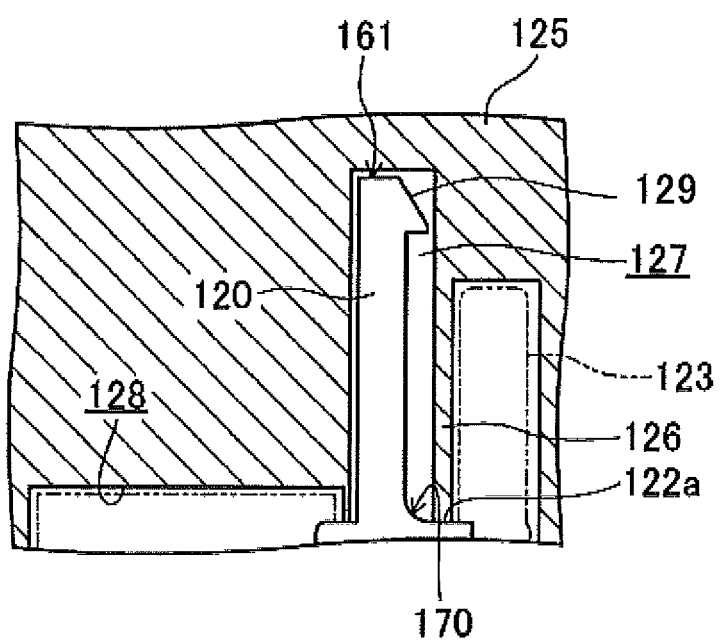
FIG. 19 is one preferred example of a partial section view showing a portion of a mold arranged to mold the casing of the molded motor according to the seventh preferred embodiment of the present invention.

A gap 124 (see FIG. 16) is preferably defined between each of the fixing extension portions 120 and the thin wall 123. A portion of a mold 125 is inserted into the gap 124 when injection-molding the casing 6. As shown in FIG. 19, a peripheral wall 126 surrounding the fixing extension portions 120 when injection-molding the casing 6 is provided on the molding surface of the mold 125. The peripheral wall 126 is inserted into the gap 124 during the injection-molding process. The tip end surface of the peripheral wall 126 makes close contact with the end surface 122a of the insulator body 122. Thus, the spaces 127 around the fixing extension portions 120 and the resin-filling cavity 128 are isolated from each other by the peripheral wall 126. For that reason, even if a resin is filled in the cavity 128 in the resin molding process, the spaces 127 around the fixing extension portions 120 are not filled with the resin. Accordingly, the entire surfaces of the fixing extension portions 120 are not covered with the resin but are kept exposed.

Each of the fixing extension portions 120 is flexible (elastically deformable) about the base end portion thereof at least in a specified direction intersecting each of the fixing extension portions 120. In the seventh preferred embodiment, the specified flexing direction is the radial direction. In the seventh preferred embodiment, each of the fixing extension portions 120 and each of the insulator bodies 122 are preferably molded with each other as a single monolithic member through the use of a thermoplastic resin. A connection portion 170 that is arranged to interconnect the radial outer surface 120a of each of the fixing extension portions 120 and the end surface 122a of each of the insulator bodies 122 facing toward the bracket cover 7 preferably has an arc shape when seen in the cross section of each of the fixing extension portions 120 taken along the motor radial direction (see FIG. 16).

A claw 161 protruding radially outward is a monolithically provided portion arranged on the radial outer surface 120a of the tip end portion of each of the fixing extension portions 120. The claw 161 preferably includes a slant surface 129 and a vertical surface 131. The claw 161 preferably includes a triangular shape when seen in the cross section of each of the fixing extension portions 120 taken along the motor radial direction. The vertical surface 131 is perpendicularly or substantially perpendicularly connected to the radial outer surface 120a of each of the fixing extension portions 120. The slant surface 129 extends from the tip end of the vertical surface 131 (the outer edge of the vertical surface 131 in the motor radial direction) toward the tip end of each of the fixing extension portions 120. The slant surface 129 is angled in a specified direction as it extends from the tip end side toward the base end side of each of the fixing extension portions 120. In the seventh preferred embodiment, the slant surface 129 is angled radially outward.

As shown in FIG. 16, the tip end surface of each of the fixing extension portions 120 is positioned more axially outward than the tip end surface 123a of the thin wall 123 of the casing 6. The distance between the tip end surface 123a of the thin wall 123 and the vertical surface 131 of the claw 161 is assumed to be d1. The distance between the tip end surface 123a of the thin wall 123 and the base end of each of the fixing extension portions 120 (i.e., the end surface 122a of each of the insulator bodies 122 facing toward the bracket cover 7) is assumed to be d2. Then, the relationship between d1 and d2 is represented by d1<d2.

Figure 20:
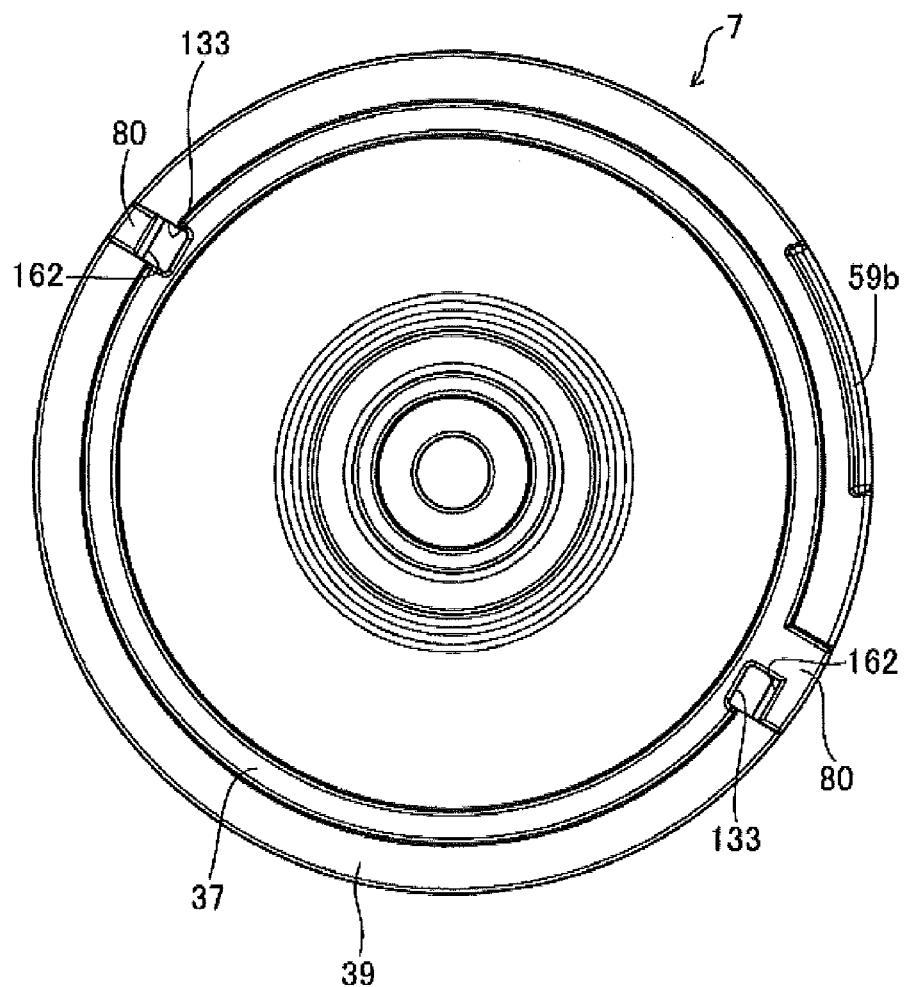
FIG. 20 is one preferred example of a plan view of the bracket cover of the molded motor according to the seventh preferred embodiment of the present invention, which is seen from the axial inner side.

Referring to FIG. 20, the cover locking blocks 80 are provided in the outer peripheral portion of the bracket cover 7 in such positions corresponding to the two cover locking recesses 81 of the casing 6. Each of the cover locking blocks 80 includes a through-hole 133 extending in the thickness direction thereof. A cover claw 162 is defined on the inner wall surface of each of the cover locking blocks 80 defining the through-hole 133. When the bracket cover 7 is attached to the casing 6, each of the fixing extension portions 120 is inserted into the through-hole 133. The claw 161 of the tip end portion of each of the fixing extension portions 120 engages with the cover claw 162 protruding into the through-hole 133.

More specifically, as shown in FIG. 16, the cover claw 162 of the bracket cover 7 is provided in the radial outer and axial inner end portion of the inner circumferential surface of the through-hole 133. The cover claw 162 protrudes radially inward from the inner circumferential surface of the through-hole 133. The cover claw 162 preferably has a slant surface 134 and a vertical surface 135. The cover claw 162 preferably has a triangular shape when seen in the cross section taken along the motor radial direction. The vertical surface 135 is perpendicular or substantially perpendicular to the inner wall surface of the through-hole 133 (to the center axis of the through-hole 133). The slant surface 134 is angled radially outward as it extends axially inward from the tip edge of the vertical surface 135. The slant surface 134 is positioned more radially inward than the thin wall 123 of the casing 6. When attaching the bracket cover 7 to the casing 6 at one axial side, the slant surface 134 makes contact with the slant surface 129 of the claw 161 of each of the fixing extension portions 120, thereby flexing each of the fixing extension portions 120 toward the other side opposite to one side in the specified direction.

In the seventh preferred embodiment, the bracket cover 7 is preferably injection-molded using the same thermosetting resin as used in molding the casing 6, for example. This makes it possible to sufficiently secure the strength required in the casing 6 and to prevent reduction of the fitting accuracy of the casing 6 and the bracket cover 7 which may be caused by the heat generated during the motor operation. As described with respect of the first preferred embodiment, the bracket cover 7 is preferably formed by injecting a resin material (thermosetting resin) into the cavity 107 defined between the upper mold 105 and the lower mold 106 and solidifying the resin material thus injected.

Figure 21:
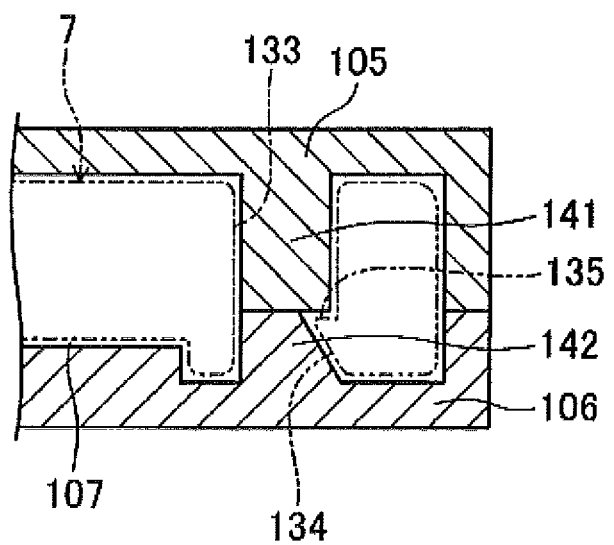
FIG. 21 is one preferred example of a partial section view showing a portion of a mold for molding the bracket cover according to the seventh preferred embodiment of the present invention.

The seventh preferred embodiment differs from the first preferred embodiment in that, as shown in FIG. 21, a first protrusion 141 is formed in the upper mold 105 and a second protrusion 142 is formed in the lower mold 106. The first protrusion 141 is provided to form the vertical surface 135 of the cover claw 162 of the bracket cover 7. The second protrusion 142 is provided to form the slant surface 134 of the cover claw 162. When the upper mold 105 and the lower mold 106 are clamped together, the tip end surfaces of the first and second protrusions 141 and 142 make contact with each other. The first and second protrusions 141 and 142 penetrate vertically through the cavity 107. Thus, the resin is not filled in the portion of the cavity 107 through which the first and second protrusions 141 and 142 penetrate. The portion of the cavity 107 not filled with the resin remains as the through-hole 133 of the bracket cover 7. If the through-hole 133 is left in that state, water droplets, dust, etc. may be infiltrated into the motor 1 through the through-hole 133. This may become a cause of trouble of the motor 1. In the seventh preferred embodiment, for the purpose of reducing such problems, the through-hole 133 of the bracket cover 7 is closed by, e.g., silicon resin or sealed by a tape or a seal.

When assembling the bracket cover 7 with the casing 6, a worker preferably initially keeps the bracket cover 7 in the position a little spaced apart from the open-side end surface of the casing 6. In that state, the worker brings the cover locking blocks 80 (see FIG. 20) of the bracket cover 7 into alignment with the two cover locking recesses 81 (see FIG. 18) defined on the open-side end surface of the casing 6. After adjusting the position of the bracket cover 7 in this manner, the worker brings the bracket cover 7 toward the open side of the casing 6. Then, the fixing extension portions 120 of the casing 6 are inserted into the through-holes 133 of the cover locking blocks 80 of the bracket cover 7. The claws 161 provided in the tip end portions of the fixing extension portions 120 engage with the cover claws 162 provided within the through-holes 133. In this way, the bracket cover 7 is completely assembled with the casing 6.

Figure 22A:
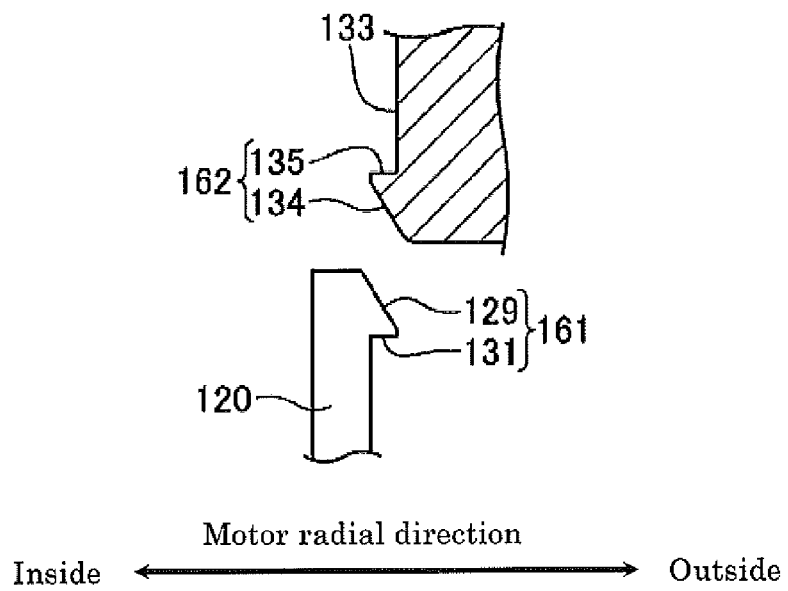
FIGS. 22A through 22C are some preferred examples of schematic diagrams illustrating an engaging process of a claw of a fixing extension portion and a claw of the bracket cover according to the seventh preferred embodiment of the present invention.
Figure 22B:
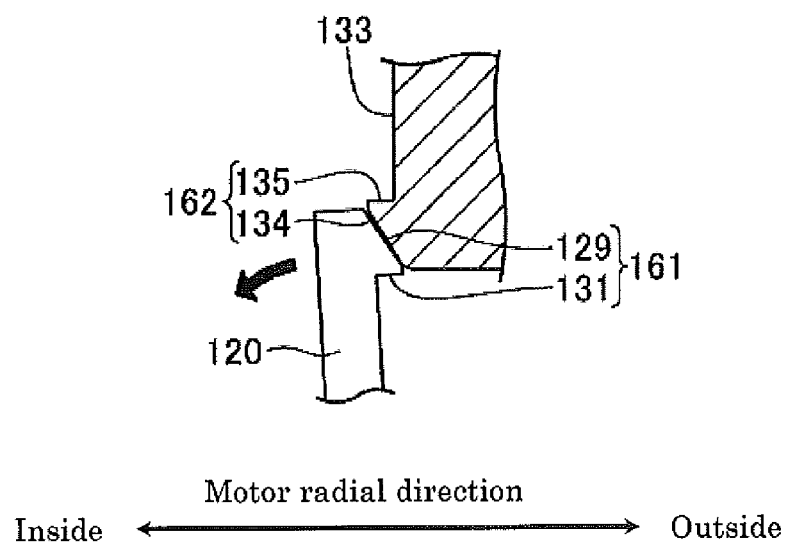
Figure 22C:
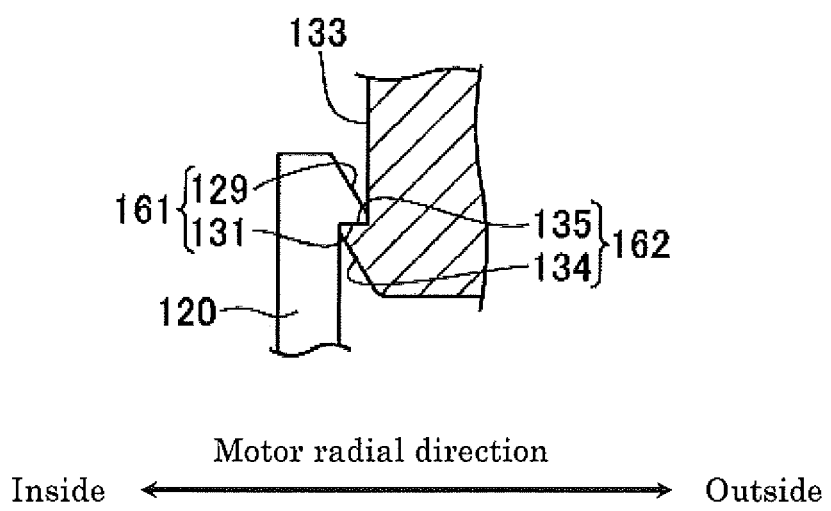

One example of an engaging process of the claws 161 and 162 will now be described in detail with reference to FIGS. 22A through 22C. Initially, the cover claws 162 of the bracket cover 7 are arranged in a spaced-apart relationship with the claws 161 of the tip end portions of the fixing extension portions 120 (see FIG. 22A). If the bracket cover 7 is pushed toward the casing 6, the slant surfaces 134 of the cover claws 162 of the bracket cover 7 come into contact with the slant surfaces 129 of the cover claws 162 of the fixing extension portions 120 and slidingly move with respect to the slant surfaces 129. Thus, pressing forces acting inward in the motor radial direction are applied to the tip end portions of the fixing extension portions 120. The fixing extension portions 120 are then flexed about the base end thereof toward the inner side in the motor radial direction (see FIG. 22B). If the bracket cover 7 is further pushed toward the casing 6, the cover claws 162 of the bracket cover 7 go over the claws 161 of the fixing extension portions 120 (see FIG. 22C).

As a result, the fixing extension portions 120 are returned to the original state (the state prior to being flexed) by the restoring force thereof. Consequently, the cover claws 162 of the bracket cover 7 and the claws 161 of the fixing extension portions 120 engage with each other.

When the cover claws 162 of the bracket cover 7 and the claws 161 of the fixing extension portions 120 are kept in an engaging state, the vertical surfaces 131 and 135 of the claws 161 and 162 make contact with each other. For example, even if the radial dimensions of the casing 6 and the bracket cover 7 are changed by the heat generated during the motor operation and even if the fitting accuracy of the casing 6 and the bracket cover 7 is reduced, the bracket cover 7 is hard to attach from the casing 6 because the two vertical surfaces 131 and 135 make contact with each other.

In the seventh preferred embodiment, unlike the fifth and sixth preferred embodiments, there is no need to additionally provide the engaging piece 112 or the fixing member 113. It is therefore possible to strongly fix the bracket cover 7 to the casing 6 using the reduced number of parts.

In the seventh preferred embodiment, each of the fixing extension portions 120 is preferably monolithically molded with each of the insulator bodies 122. This makes it possible to fix the bracket cover 7 to the casing 6 using the reduced number of parts, as compared with a case where the bracket cover 7 is fixed to the casing 6 through the use of additional members as in the fifth and sixth preferred embodiments.

In the seventh preferred embodiment, as compared with a case where the bracket cover 7 is fixed to the casing 6 through the use of additional members as in the fifth and sixth preferred embodiments, it is possible to easily manage the dimensions of the respective molded products because the molded products require reduced dimensional accuracy.

Figure 23A:
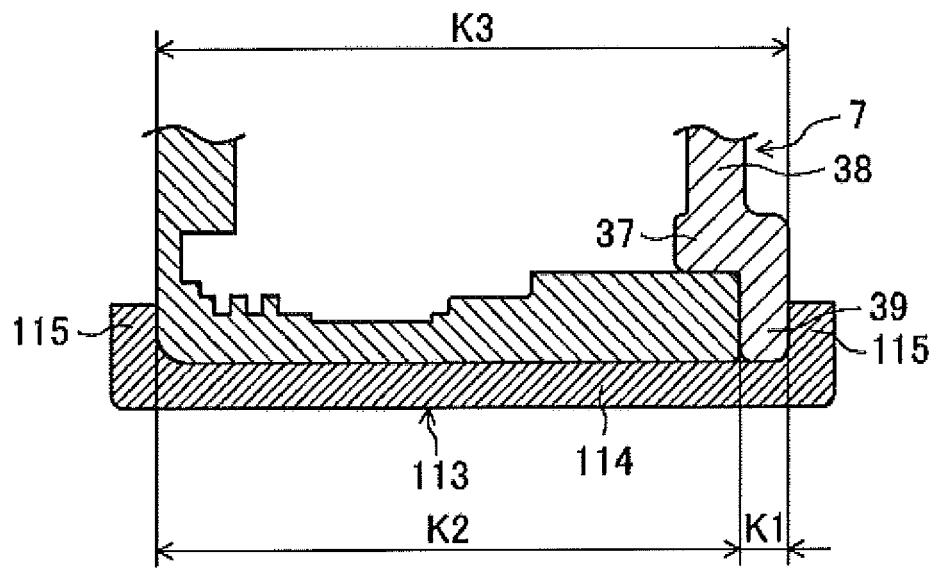
FIG. 23A is one preferred example of a view indicating management dimensions in case of employing the bracket cover attaching structure according to the sixth preferred embodiment of the present invention.
Figure 23B:
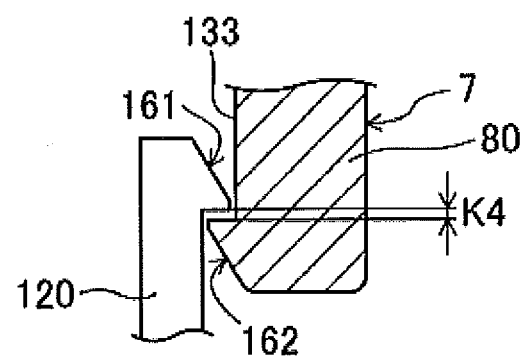
FIG. 23B is one preferred example of a view indicating management dimensions in case of employing the bracket cover attaching structure according to the seventh preferred embodiment of the present invention.

In case of the sixth preferred embodiment, as shown in FIG. 23A, there is a need to accurately manage three dimensions, namely the thickness K1 of the flange portion 39, the axial length K2 of the casing 6 and the distance K3 between the fixing pieces 115 of the fixing member 113, so that the fixing member 113 should not be out of alignment. This is because the fixing member 113 may possibly be out of alignment with the casing 6 if the management of the dimensional accuracy is improperly performed. In the seventh preferred embodiment, even if a small gap K4 (see FIG. 23B) exists between the claw 161 of the tip end portion of each of the fixing extension portions 120 and the cover claw 162 of the bracket cover 7, the bracket cover 7 will not get out of alignment with the casing 6 even though an axial looseness corresponding to the gap K4 is generated between the bracket cover 7 and the casing 6.

Accordingly, there is no need to precisely manage the dimensions of the respective molded products as in the sixth preferred embodiment. This makes it possible to enhance the productivity of the motor 1.

In the seventh preferred embodiment, the cover claws 162 of the bracket cover 7 engaging with the claws 161 of the fixing extension portions 120 are provided with the through-holes 133 of the bracket cover 7. Accordingly, the claws 161 of the fixing extension portions 120 are positioned within the through-holes 133 when the bracket cover 7 is assembled with the casing 6. This eliminates the possibility that the claws 161 will become obstacles when the motor 1 is attached to different kinds of devices. It is therefore possible to smoothly perform a process of attaching the motor 1 to the devices.

In this regard, when assembling the bracket cover 7 with the casing 6, each of the fixing extension portions 120 flex about the base end thereof toward the inner side in the motor radial direction as set forth above. Therefore, the base end portions of the fixing extension portions 120 need to have high enough strength and flexibility (i.e., elastic deformability) in order to reduce breakage of the base end portions of the fixing extension portions 120.

In the seventh preferred embodiment, however, the surfaces of the base end portions of the fixing extension portions 120 are preferably not covered with a resin but are instead kept exposed. Therefore, the support stiffness of the fixing extension portions 120 with respect to the insulator bodies 122 is reduced as the base end portions of the fixing extension portions 120 are not covered with a resin. As a consequence, the flexibility (elastic deformability) of the fixing extension portions 120 in the motor radial direction is enhanced. The distance between the tip end surface 123a of the thin wall 123 of the casing 6 and the base end surface of each of the fixing extension portions 120 is assumed to be d2. The distance between the tip end surface 123a of the thin wall 123 of the casing 6 and the vertical surface 131 of the claw 161 of each of the fixing extension portions 120 is assumed to be d1. In the seventh preferred embodiment, the distance d2 is set longer than the distance d1, thereby further enhancing the flexibility of the fixing extension portions 120.

The insulator bodies 122 are preferably made of an easily-deformable thin material, e.g., a thermoplastic resin. Use of the thermoplastic resin makes it possible to reduce the thickness of the insulator bodies 122 as much as possible. As a result, the occupancy of the stator coils 21 (see FIG. 16) wound on the tooth portions 18 of the stator core 17 through the insulator bodies 122 is increased, which leads to an increase in the motor performance.

In the seventh preferred embodiment, each of the fixing extension portions 120 is monolithically molded with each of the insulator bodies 122 using the same thermoplastic resin. The fixing extension portions 120 made of a thermoplastic resin have increased flexibility. The insulators 19a are molded with and embedded in the casing 6. Since each of the fixing extension portions 120 is monolithically molded with each of the insulator bodies 122, an allowable stress against axial tension grows higher. In addition, the fixing extension portions 120 are highly resistant to the removal force of the bracket cover 7 generated by an axial load.

A tensile stress acts when each of the fixing extension portions 120 is flexed inward in the motor radial direction. Therefore, a crack is easily generated in the connection portion 170 that interconnects the radial outer surface 120a of each of the fixing extension portions 120 and the end surface 122a of each of the insulator bodies 122 facing toward the bracket cover 7. In the seventh preferred embodiment, however, the connection portion 170 is provided as an arc shape (rounded cross-sectional shape) when seen in the cross section of each of the fixing extension portions 120 taken along the motor radial direction. Thus, the thickness of the connecting portion 170 in the motor radial direction is increased even a little bit, which leads to an increase in the strength of the connecting portion 170. Moreover, this alleviates stress concentration on the connecting portion 170. Accordingly, the base end portions of the fixing extension portions 120 will not be broken when the bracket cover 7 is assembled with the casing 6.

Modified Example

Figure 24:
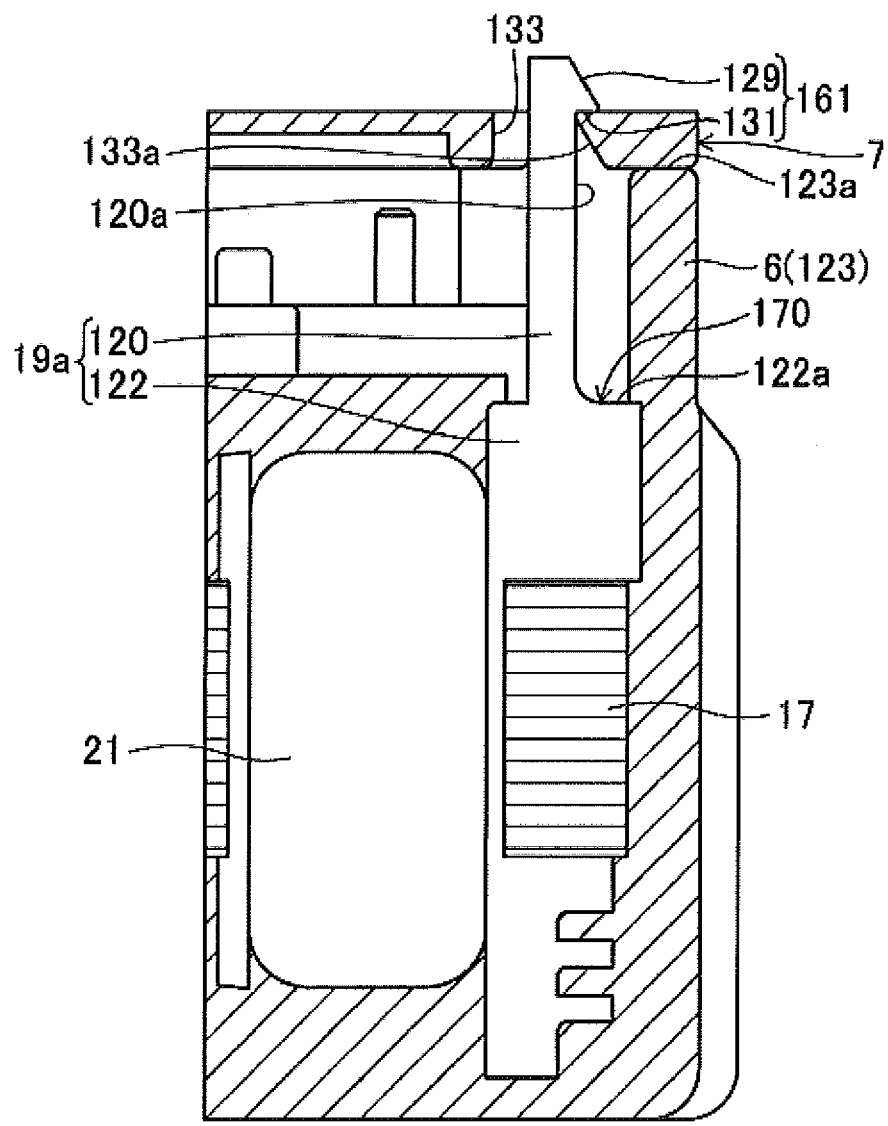
FIG. 24 is one preferred example of a section view illustrating a bracket cover attaching structure according to a modified example of the seventh preferred embodiment of the present invention.

FIG. 24 shows one preferred modified example of the seventh preferred embodiment of the present invention. This modified example differs from the seventh preferred embodiment in terms of the engaging structure of the claws 161 of the fixing extension portions 120 with the bracket cover 7. The components substantially identical with those shown in FIG. 16 will be designated by like reference symbols and will not be described in detail, if appropriate.

In the modified example shown in FIG. 24, the claw 161 of the tip end portion of each of the fixing extension portions 120 protrudes radially inward from the radial inner surface 120a of the tip end portion of each of the fixing extension portions 120 and axially outward from the through-hole 133 of the bracket cover 7 when the bracket cover 7 is assembled with the casing 6. The claw 161 engages with the edge portion of the through-hole 133. A slant surface 133a is formed in the radial outer end portion of the inner wall surface of the bracket cover 7 defining the through-hole 133. The slant surface 133a is angled radially inward as it extends from the axial inner side toward the axial outer side.

The bracket cover 7, when assembled, is moved toward the casing 6. Then, the slant surface 129 of the claw 161 of each of the fixing extension portions 120 comes into contact with the slant surface 133a of the bracket cover 7. If the bracket cover 7 is further pushed toward the casing 6, the slant surface 133a of the bracket cover 7 is slidingly moved along the slant surface 129 of the claw 161 of each of the fixing extension portions 120. Consequently, a pressing force acting inward in the motor radial direction is applied to the tip end portion of each of the fixing extension portions 120. Thus, each of the fixing extension portions 120 is flexed radially inward about the base end thereof.

If the bracket cover 7 is further pushed toward the casing 6, the claw 161 of each of the fixing extension portions 120 protrudes out of the motor away from the through-hole 133. As a result, each of the fixing extension portions 120 is returned to the original state by the restoring force thereof. The claw 161 of each of the fixing extension portions 120 comes into engagement with the edge portion of the through-hole 133. In this manner, the bracket cover 7 is completely assembled with the casing 6.

In this modified example, there is no need to provide the cover claw 162 within the through-hole 133 of the bracket cover 7. This helps simplify the structure of the molds for molding the bracket cover 7 and can provide the same effects as obtained in the seventh preferred embodiment.

Eighth Preferred Embodiment

FIGS. 25A through 25C and 26A through 26C show one preferred example of an eighth preferred embodiment. The eighth preferred embodiment differs from the seventh preferred embodiment in terms of the structure arranged to fix the bracket cover 7 to the casing 6.

In the eighth preferred embodiment, the claw 161 of each of the fixing extension portions 120 protrudes radially inward from the radial inner surface 120b of the tip end portion of each of the fixing extension portions 120. When attaching the bracket cover 7 to the casing 6, each of the fixing extension portions 120 is flexed about the base end thereof toward the outer side in the motor radial direction. The connecting portion 170 that interconnects the radial inner surface 120b of each of the fixing extension portions 120 and the end surface 122a of each of the insulator bodies 122 facing toward the bracket cover 7 preferably has an arc shape when seen in the cross section of each of the fixing extension portions 120 taken along the motor radial direction.

Two slant surfaces 145 (only one of which is shown in FIGS. 25A-26C) are provided on the outer circumferential surface of the cylindrical portion 37 of the bracket cover 7 in a corresponding relationship with the two fixing extension portions 120. The slant surfaces 145 are arranged in the outer edge area of the tip end surface 37a (axial end surface) of the cylindrical portion 37. The slant surfaces 145 are arranged to oppose to each other in the radial direction of the cylindrical portion 37. The slant surfaces 145 are angled radially outward as they extend from the tip end side toward the base end side of the cylindrical portion 37. The inclination angle of the slant surfaces 145 is in a range of, e.g., about 40° to about 60°.

Locking piece portions 146 adjoining to the slant surfaces 145 are provided on the outer circumferential surface of the cylindrical portion 37 at one circumferential side of the slant surfaces 145. Each of the locking piece portions 146 is defined by a flat piece axially extending along the outer circumferential surface of the cylindrical portion 37 and protruding radially outward.

Engaging holes 147 adjoining to the slant surfaces 145 are defined on the outer circumferential surface of the cylindrical portion 37 at the other circumferential side of the slant surfaces 145. The engaging holes 147 are arranged in the positions shifted toward the base end of the cylindrical portion 37 (toward the flange portion 39) with respect to the slant surfaces 145 (see FIGS. 25A through 25C). The engaging holes 147 preferably have a rectangular shape or substantially rectangular shape when seen in the radial direction of the cylindrical portion 37. The inner wall surface of each of the engaging holes 147 preferably includes a pair of side wall surfaces 147a and 147b opposing to each other in the axial direction of the cylindrical portion 37. The side wall surface 147a is positioned at the tip end side of the cylindrical portion 37 (at the side of the insulator bodies 122). The side wall surface 147a serves as an engaging surface that engages with the claw 161 of each of the fixing extension portions 120. The engaging surface is arranged perpendicularly or substantially perpendicularly with respect to the center axis of the cylindrical portion 37.

When assembling the bracket cover 7 with the casing 6, a worker initially keeps the bracket cover 7 in the position a little spaced apart from the open-side end surface of the casing 6. In that state, the worker brings the two slant surfaces 145 of the cylindrical portion 37 into alignment with the two fixing extension portions 120 of the casing 6. After performing the aligning process, the worker brings the bracket cover 7 toward the open side of the casing 6. If the flange portion 39 of the bracket cover 7 comes into contact with the end surface of the casing 6, the worker rotates the bracket cover 7 in the circumferential direction. Then, the claws 161 of the tip end portions of the fixing extension portions 120 come into engagement with engaging holes 147. Thus, the bracket cover 7 is completely assembled with the casing 6.

One example of the engaging process of the claws 161 will now be described in detail with reference to FIGS. 25A through 27B. Initially, the slant surfaces 145 of the cylindrical portion 37 of the bracket cover 7 are kept in the positions spaced a little apart from the slant surfaces 129 of the claws 161 of the tip end portions of the fixing extension portions 120 (see FIGS. 25A and 26A). If the bracket cover 7 is pushed toward the casing 6, the slant surfaces 129 of the claws 161 of the fixing extension portions 120 are brought into contact with, and slidingly moved along, the slant surfaces 145 of the cylindrical portion 37 of the bracket cover 7. As a result, pressing forces acting radially outward are applied to the tip end portions of the fixing extension portions 120. Each of the fixing extension portions 120 is flexed radially outward about the base end thereof.

Figure 25A:
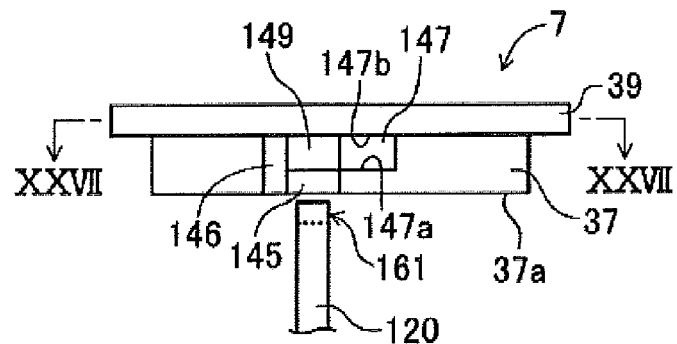
FIGS. 25A through 25C are some preferred examples of side views of a bracket cover attaching structure according to an eighth preferred embodiment of the present invention, which is seen in the radial direction of the bracket cover.
Figure 25B:
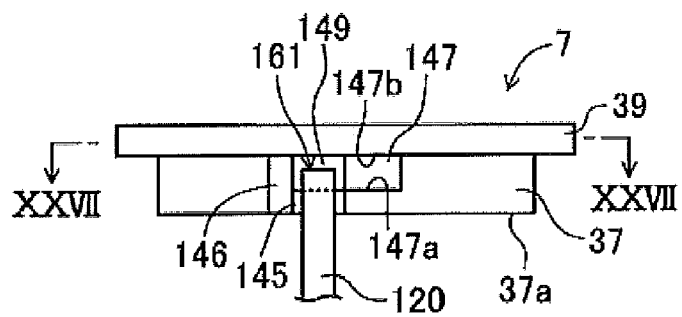
Figure 25C:
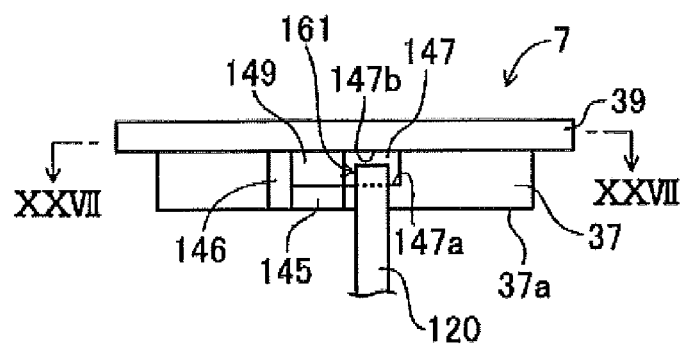
Figure 26A:
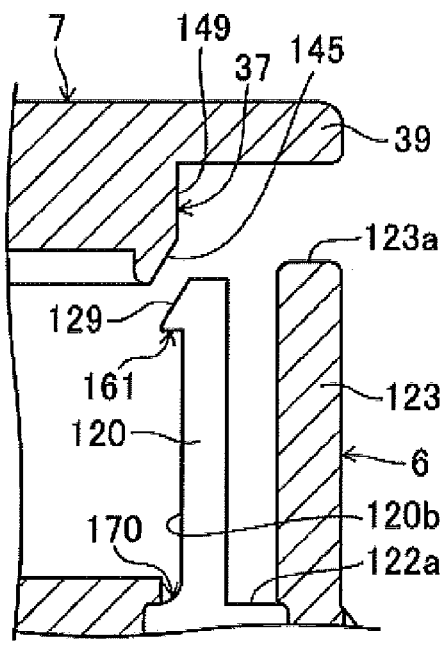
FIGS. 26A through 26C are some preferred examples of section views of the bracket cover attaching structure taken along the radial direction of the molded motor according to the eighth preferred embodiment of the present invention.
Figure 26B:
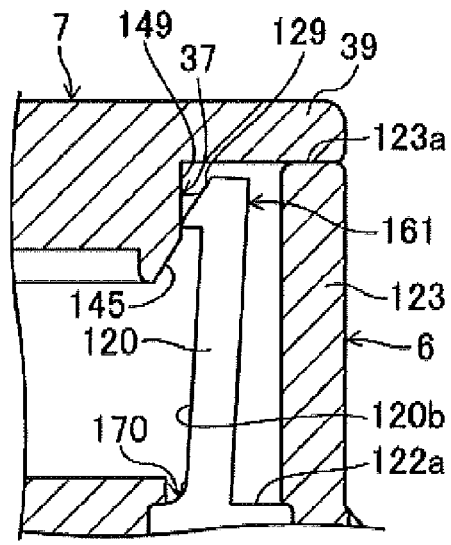
Figure 26C:
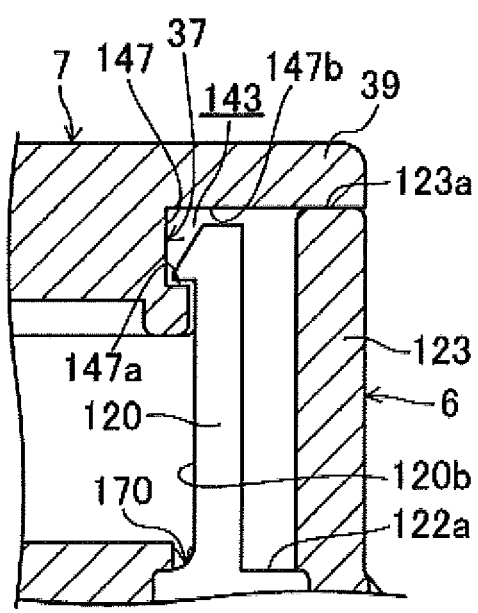
Figure 27A:
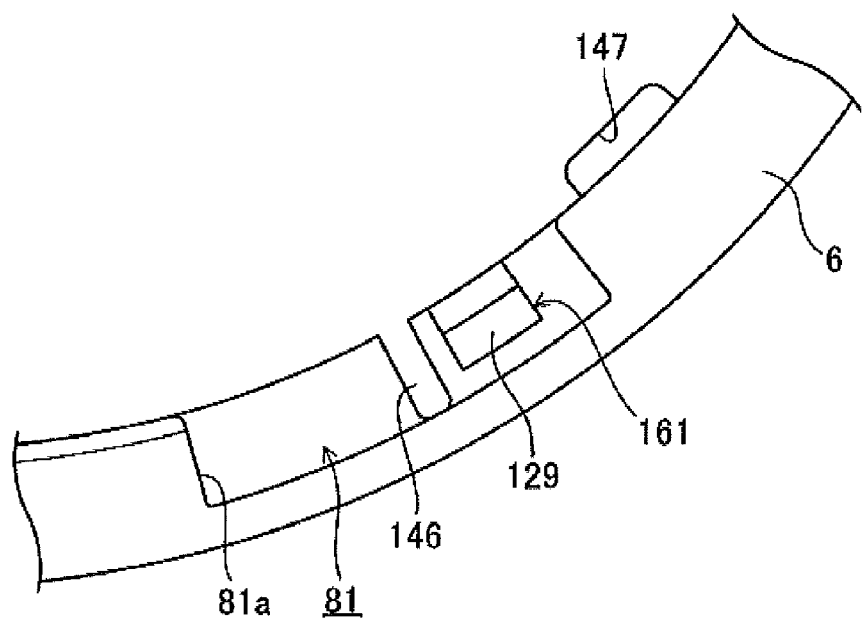
FIGS. 27A and 27B are some preferred examples of section views of the bracket cover attaching structure according to the eighth preferred embodiment of the present invention, which is taken along line XXVII-XXVII in FIGS. 25A-25C.
Figure 27B:
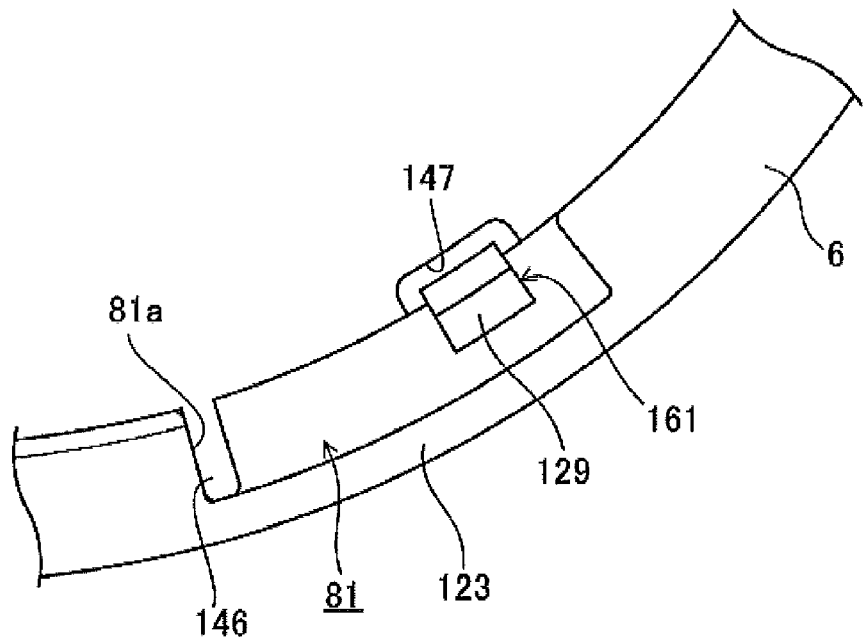

If the bracket cover 7 is further pushed toward the casing 6, the claws 161 of the fixing extension portions 120 ride on the cylindrical surface 149 of the cylindrical portion 37 positioned at the base end side of the slant surfaces 145 (see FIGS. 25B and 26B). If the bracket cover 7 is rotated in that state, the locking piece portions 146 of the cylindrical portion 37 come into contact with the side end surfaces 81a of the cover locking recesses 81. When the locking piece portions 146 come into contact with the side end surfaces 81a, the claws 161 of the fixing extension portions 120 reach the engaging holes 147 (see FIG. 27B). Then, the fixing extension portions 120 are returned to the original state by the restoring forces thereof. At the same time, the claws 161 of the tip end portions of the fixing extension portions 120 engage with the engaging holes 147, thereby finishing the process of assembling the bracket cover 7 (see FIGS. 25C and 26C).

With this configuration, the through-holes 133 included in the sixth and seventh preferred embodiments may not be provided in the bracket cover 7. Therefore, the problem of foreign materials being infiltrated through the through-holes 133 is solved. Moreover, it is not necessary to close the through-holes 133 with silicon or other materials. Accordingly, the motor of the eighth preferred embodiment is superior in productivity and achieves significant cost reduction.

Ninth Preferred Embodiment

Figure 28A:
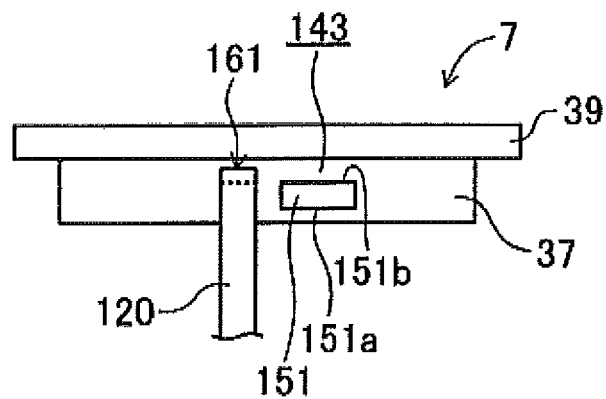
FIGS. 28A and 28B are some preferred examples of side views of a bracket cover attaching structure according to a ninth preferred embodiment of the present invention, which is seen in the radial direction of the bracket cover.
Figure 28B:
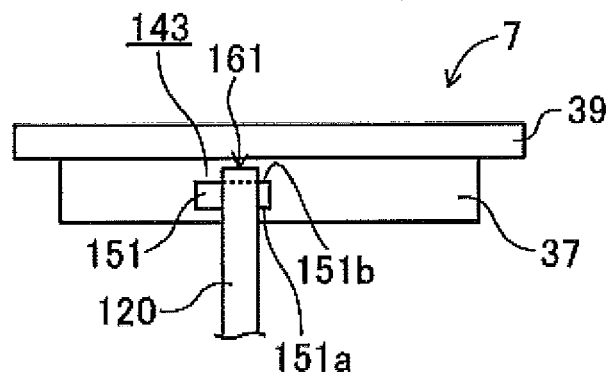
Figure 29:
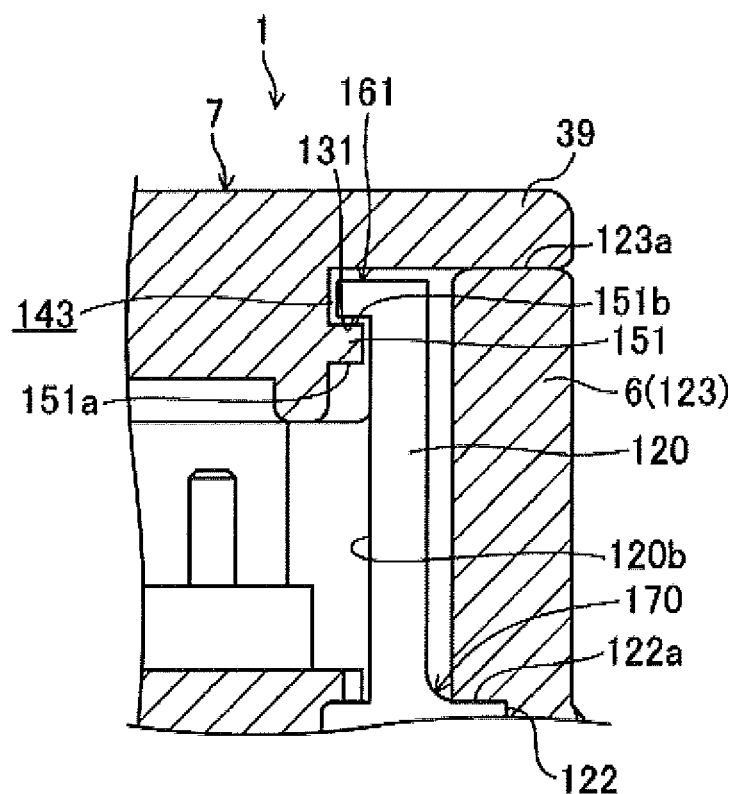
FIG. 29 is one preferred example of a section view illustrating a bracket cover attaching structure according to the ninth preferred embodiment of the present invention.

FIGS. 28A, 28B, and 29 show one preferred example of a ninth preferred embodiment. The ninth preferred embodiment differs from the seventh and eighth preferred embodiments in terms of the structure arranged to fix the bracket cover 7 to the casing 6.

In the ninth preferred embodiment, the claw 161 of each of the fixing extension portions 120 protrudes radially inward from the radial inner surface 120b of the tip end portion of each of the fixing extension portions 120. The claw 161 preferably has a rectangular shape or substantially rectangular shape when seen in the cross section taken along the motor radial direction. The claw 161 preferably includes a vertical surface 131.

A flat projection portion 151 extending in the circumferential direction and protruding radially outward is arranged on the outer circumferential surface of the cylindrical portion 37 of the bracket cover 7. The projection portion 151 includes a pair of side surfaces 151a and 151b spaced apart from each other in the thickness direction. The side surface 151b faces toward the base end of the cylindrical portion 37 (toward the flange portion 39). The side surface 151b is arranged to serve as an engaging surface that engages with the claw 161 of each of the fixing extension portions 120. The engaging surface is provided perpendicularly or substantially perpendicularly with respect to the center axis of the cylindrical portion 37. An air-gap portion 143 arranged to accommodate the claw 161 is defined between the projection portion 151 (the engaging surface) and the flange portion 39 of the bracket cover 7.

When attaching the bracket cover 7 to the casing 6, a worker initially keeps the bracket cover 7 in the position spaced a little apart from the open-side end surface of the casing 6. Then, the worker rotates the bracket cover 7 about the center axis. By doing so, the worker adjusts the position of the projection portion 151 of the cylindrical portion 37 to be shifted a little in the circumferential direction with respect to each of the fixing extension portions 120.

After adjusting the position of the projection portion 151, the worker brings the bracket cover 7 toward the open side of the casing 6. If the flange portion 39 of the bracket cover 7 comes into contact with the end surface of the casing 6, the worker rotates the bracket cover 7 in the circumferential direction. Then, the claw 161 of each of the fixing extension portions 120 enters the air-gap portion 143 defined between the projection portion 151 of the cylindrical portion 37 and the flange portion 39 of the bracket cover 7 (see FIG. 28B). Thus, the projection portion 151 engages with the claw 161 of each of the fixing extension portions 120. In this manner, the bracket cover 7 is completely assembled with the casing 6.

In the ninth preferred embodiment, unlike the sixth and seventh preferred embodiments, the fixing extension portions 120 are not flexed in the radial direction when the bracket cover 7 is assembled with the casing 6. It is therefore possible to reduce the possibility of the fixing extension portions 120 being broken when assembling the bracket cover 7. Just like the eighth preferred embodiment, it is not necessary to form the through-holes 133 in the bracket cover 7. Therefore, the problem of foreign materials being infiltrated through the through-holes 133 is solved.

In the ninth preferred embodiment, unlike the sixth and seventh preferred embodiments, there is no need to form the slant surface 129 in the claw 161 of each of the fixing extension portions 120. This helps simplify the shape of the fixing extension portions 120.

Other Preferred Embodiments

The present invention is not limited to the preferred embodiments described above but may include various kinds of other configurations. While the motors of the preferred embodiments described above preferably make use of unsaturated polyester as a resin, the present invention is not limited thereto. Other resin materials may be used in place of unsaturated polyester.

In the preferred embodiments described above, if the rotor 3 is moved in the motor axial direction, the washer 69 preferably makes contact with the rotor 3, thereby restraining the movement of the rotor 3. However, the present invention is not limited thereto. For example, the washer 69 may not be provided so that the rotor 3 can make direct contact with the tip end surface of the bearing retainer 15. An opening having a diameter greater than the diameter of the inner tube portion 45 of the rotor 3 may be provided on the tip end surface of the bearing retainer 15. In this case, if the rotor 3 is moved in the motor axial direction, the inner tube portion 45 passes through the opening and makes contact with the end surface of the bearing 9a or 9b.

In the preferred embodiments described above, the protrusion 36 engaging with the cover supported groove 33 preferably is provided on the inner circumferential surface of the boss portion 34 of the bracket cover 7, or the contact portion 95 or 96 preferably is provided in the boss portion 34 of the bracket cover 7, in order to perform the axial positioning of the bearing retainer 15. As an alternative example, a protrusion protruding radially inward may be arranged on the inner circumferential surface of the boss portion 34, and an engagement recess portion engaging with the protrusion may be arranged on the outer circumferential surface of the bearing retainer 15.

In this case, the protrusion serves as a stopper arranged to prevent the bearing retainer 15 from rotating about the center axis. The protrusion may have, e.g., a spherical shape or a cylindrical shape. As a result, the bearing retainer 15 is prevented from rotating about the center axis thereof during the motor operation. Moreover, the outer circumferential surface of the bearing retainer 15 is prevented from sliding along the inner circumferential surface of the boss portion 34 (the inner circumferential surface of the through-hole 35) and suffering from wear. In addition, the bearing retainer 15 is prevented from moving during the motor operation, which may otherwise impair the aligning function thereof.

In the preferred embodiments described above, one axial side of the casing 6 preferably is opened and covered with the bracket cover 7. However, the present invention is not limited thereto. The axial opposite sides of the casing 6 may be opened and may be covered with the bracket covers 7. In this case, all the bearings 9a and 9b may be supported on the bracket cover 7 through the bearing retainers 15.

The configuration of making the bracket cover 7 from a metallic member is not included in the present preferred embodiment. However, the effects provided in the preferred embodiments described above, namely the effect of improving the alignment function achieved by the rigidity setting of the bearing retainer 15, the wedge effect achieved by the shape of the cover locking blocks 80 of the bracket cover 7, the effect of restraining the position of the rotor 3 exercised by the washer 69 and the effect of enhancing the ease of assembly of the motor 1, are not lost even if the bracket cover 7 is made of a metallic material.

In the seventh to ninth preferred embodiments, the fixing extension portions 120 preferably are flexed in the motor radial direction when the bracket cover 7 is attached to the casing 6. However, the present invention is not limited thereto. For example, the fixing extension portions 120 may be flexed in the motor circumferential direction.

Preferred embodiments of the present invention are useful in a molded motor in which a stator is preferably embedded in a casing by covering the same with a resin, for example. Preferred embodiments of the present invention are particularly useful in a molded motor in which unsaturated polyester is used as a molding resin, for example.

With the configurations described above, the bracket cover preferably is made of a resin material and not a metallic material, thereby reducing an electric potential difference from being generated between the bracket cover and the stator core and consequently reducing the bearing from suffering from electric corrosion. In this regard, the resin material is inferior in processing accuracy to the metallic material. Therefore, if the material of the bracket cover is merely changed from the metallic material to the resin material, the accuracy of assembling the bracket cover with the casing and the accuracy of attaching the bearing to the bracket cover grow lower. In addition, an off-center condition of the shaft is generated and the rotation accuracy of the shaft is reduced.

In various preferred embodiments of the present invention, however, the bearings arranged to support the shaft preferably are covered and held at the radial outer side thereof by the bearing retainers made of an elastic body. Then, the bearings are attached to the bracket cover and the casing through the bearing retainers. By doing so, the off-centering of the shaft is absorbed by the elastic deformation of the bearing retainers. In preferred embodiments of the present invention, therefore, the electric corrosion of the bearings is prevented and minimized without reducing the rotation accuracy of the shaft.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A molded motor, comprising:
a stator;
a resin casing;
a rotor;
a pair of bearings;
a pair of bearing retainers;
a resin bracket cover; and
a control board; wherein
the stator includes a ring-shaped stator core including tooth portions and stator coils wound on the tooth portions of the stator core;
the casing has a closed-bottom tubular shape opened at one axial side;
the stator is fixed to the casing by covering the stator with a resin and embedding the stator in the casing;
the rotor includes a shaft and is arranged radially inward of the stator;
the bearings are arranged to rotatably support the shaft;
the bearing retainers are made of an elastic electrically insulating body and are arranged to cover the bearings at radial outer sides of the bearings and to hold the bearings in place;
the bracket cover is arranged to cover an open side of the casing;
the control board includes a circuit arranged to control a drive current supplied to the stator coils; and
one of the bearings is attached to the bracket cover through one of the bearing retainers, the other of the bearings is attached to a bottom wall portion of the casing through the other bearing retainer.

2. The motor of claim 1, wherein the bearings are resin slide bearings.

3. The motor of claim 2, wherein each of the bearings includes a hollow tubular sleeve body with inner and outer circumferential surfaces, the shaft is supported on an inner circumferential surface of the sleeve body, an outer circumferential surface of the sleeve body is at least partially spherical shaped, and each of the bearing retainers includes a spherical holding portion arranged to slidably hold the outer circumferential surface of the sleeve body.

4. The motor of claim 1, wherein the bracket cover is made of the same resin material as the casing.

5. A molded motor, comprising:
a stator;
a resin casing;
a rotor;
a pair of bearings;
a pair of bearing retainers;
a resin bracket cover; and
a control board; wherein
the stator includes a ring-shaped stator core including tooth portions and stator coils wound on the tooth portions of the stator core;
the casing has a closed-bottom tubular shape opened at one axial side;
the stator is fixed to the casing by covering the stator with a resin and embedding the stator in the casing;
the rotor includes a shaft and is arranged radially inward of the stator;
the bearings are arranged to rotatably support the shaft;
the bearing retainers are made of an elastic electrically insulating body and are arranged to cover the bearings at radial outer sides of the bearings and to hold the bearings in place;
the bracket cover is arranged to cover an open side of the casing;
the control board includes a circuit arranged to control a drive current supplied to the stator coils;
one of the bearings is attached to the bracket cover through one of the bearing retainers, the other of the bearings is attached to a bottom wall portion of the casing through the other bearing retainer;
the stator coils are wound on the tooth portions through an insulator;
the insulator includes an insulator body and a fixing extension portion molded as a single monolithic element with the insulator body;
the insulator body is arranged to cover a surface of each of the tooth portions;
the fixing extension portion extends from an end surface of the insulator body toward the bracket cover and includes a tip end portion and a claw provided in the tip end portion; and
the bracket cover includes a cover claw arranged to engage with the claw of the fixing extension portion when the bracket cover is attached to the casing.

6. The motor of claim 5, wherein the bearings are resin slide bearings.

7. The motor of claim 6, wherein each of the bearings includes a hollow tubular sleeve body with inner and outer circumferential surfaces, the shaft is supported on an inner circumferential surface of the sleeve body, an outer circumferential surface of the sleeve body is at least partially spherical shaped, and each of the bearing retainers includes a spherical holding portion arranged to slidably hold the outer circumferential surface of the sleeve body.

8. The motor of claim 5, wherein the bracket cover is made of the same resin material as the casing.

9. The motor of claim 5, wherein the fixing extension portion is configured to flex about a base end thereof at least in a specified direction intersecting the fixing extension portion, the claw of the fixing extension portion includes a slant surface angled toward one side in the specified direction as the slant surface extends from a tip end side of the fixing extension portion toward a base end side of the fixing extension portion, the cover claw of the bracket cover includes a slant surface arranged to, when attaching the bracket cover to the casing from one axial side of the casing, make contact with the slant surface of the claw of the fixing extension portion and flex the fixing extension portion toward the other side opposite to the one side in the specified direction.

10. The motor of claim 9, wherein the specified direction is a motor radial direction or a motor circumferential direction.

11. The motor of claim 5, wherein the bracket cover includes a through-hole with an inner wall surface, and the cover claw of the bracket cover is arranged on the inner wall surface of the through-hole.

12. The motor of claim 9, wherein the bracket cover includes a through-hole with an inner wall surface, and the cover claw of the bracket cover is arranged on the inner wall surface of the through-hole.

13. The motor of claim 11, wherein the casing includes an end surface and a positioning recess portion defined on the end surface of the casing, the bracket cover includes a cylindrical portion press-fitted to an inner circumferential surface of an open-side end portion of the casing, a flange portion protrudes radially outward of the cylindrical portion and makes contact with the end surface of the casing and a cover locking block provided in the flange portion and arranged to engage with the positioning recess portion, and the through-hole is defined in the cover locking block of the bracket cover.

14. The motor of claim 11, wherein the through-hole is closed by a silicon resin or a tape.

15. The motor of claim 5, wherein the bracket cover and the casing are made of a thermosetting resin and the fixing extension portion is made of a thermoplastic resin.

16. The motor of claim 5, wherein the fixing extension portion includes a base end portion that is exposed and not covered with the resin.

17. The motor of claim 5, wherein the fixing extension portion includes a tip end surface positioned more axially outward than an axial end surface of the casing, a distance between the axial end surface of the casing and the base end portion of the fixing extension portion is greater than a distance between the axial end surface of the casing and the tip end surface of the fixing extension portion.

18. The motor of claim 5, wherein a connecting portion interconnecting one side surface of the fixing extension portion in the specified direction and an end surface of the insulator body facing toward the bracket cover has an arc shape when seen in a cross section taken along a motor radial direction.

19. The motor of claim 5, wherein the bracket cover includes a through-hole and the cover claw of the bracket cover is defined by an edge portion of the through-hole.

20. A molded motor, comprising:
a stator;
a resin casing;
a rotor;
a pair of bearings;
a pair of bearing retainers;
a resin bracket cover; and
a control board; wherein
the stator includes a ring-shaped stator core provided with tooth portions and stator coils wound on the tooth portions of the stator core;
the casing has a closed-bottom tubular shape opened at one axial side;
the stator is fixed to the casing by covering the stator with a resin and embedding the stator in the casing;
the rotor includes a shaft and is arranged radially inward of the stator;

the bearings are resin slide bearings and arranged to rotatably support the shaft;

the bearing retainers are made of an elastic electrically insulating body and are arranged to cover the bearings at radial outer sides of the bearings and to hold the bearings in place;

the slide bearings include a hollow tubular sleeve body with inner and outer circumferential surfaces;

the shaft is supported on the inner circumferential surface of the sleeve body;

the outer circumferential surface of the sleeve body is at least partially defined by a spherical shape;

each of the bearing retainers includes a spherical holding portion arranged to slidably hold the outer circumferential surface of the sleeve body;

the bracket cover is arranged to cover an open side of the casing;

the control board includes a circuit arranged to control a drive current supplied to the stator coils;

one of the bearings is attached to the bracket cover through one of the bearing retainers, the other of the bearings is attached to a bottom wall portion of the casing through the other bearing retainer;

the bracket cover is made of the same resin material as the casing;

the stator coils are wound on the tooth portions through an insulator;

the insulator includes an insulator body and a fixing extension portion one-piece molded with the insulator body;

the insulator body is arranged to cover a surface of each of the tooth portions;

the fixing extension portion extends from an end surface of the insulator body toward the bracket cover and includes a tip end portion and a claw defined in the tip end portion;

the bracket cover includes a cover claw engaging with the claw of the fixing extension portion when the bracket cover is attached to the casing;

the fixing extension portion is configured to flex about a base end thereof at least in a specified direction;

the claw of the fixing extension portion includes a slant surface angled toward one side in the specified direction as the slant surface extends from a tip end side of the fixing extension portion toward a base end side of the fixing extension portion;

the cover claw of the bracket cover includes a slant surface arranged to make contact with the slant surface of the claw of the fixing extension portion and flex the fixing extension portion toward the other side opposite to said one side in the specified direction when attaching the bracket cover to the casing from one axial side of the casing, the specified direction being a motor radial direction or a motor circumferential direction;

the bracket cover includes a through-hole with an inner wall surface;

the cover claw of the bracket cover is defined on the inner wall surface of the through-hole;

the fixing extension portion is made of a thermoplastic resin;

the casing includes an end surface and a positioning recess portion defined on the end surface of the casing; and the bracket cover includes a cylindrical portion press-fitted to an inner circumferential surface of an open-side end portion of the casing, a flange portion protruding radially outward of the cylindrical portion and making contact with the end surface of the casing and a cover locking block provided in the flange portion and arranged to engage with the positioning recess portion, the through-hole being defined in the cover locking block of the bracket cover.

\* \* \* \* \*